United States Patent
Luo et al.

(10) Patent No.: US 12,388,972 B2
(45) Date of Patent: Aug. 12, 2025

(54) PROJECTION OPTICAL ENGINE, ELECTRONIC DEVICE, AND PROJECTION IMAGING METHOD

(71) Applicant: HUAWEI TECHNOLOGIES CO., LTD., Guangdong (CN)

(72) Inventors: Kun Luo, Shenzhen (CN); Pengfei Zhao, Shenzhen (CN); Congbiao Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/613,347

(22) Filed: Mar. 22, 2024

(65) Prior Publication Data
US 2024/0236289 A1     Jul. 11, 2024

Related U.S. Application Data

(63) Continuation of application No. PCT/CN2021/120230, filed on Sep. 24, 2021.

(51) Int. Cl.
*H04N 13/334*     (2018.01)
*H04N 13/324*     (2018.01)
(Continued)

(52) U.S. Cl.
CPC ......... *H04N 13/334* (2018.05); *H04N 13/324* (2018.05); *H04N 13/344* (2018.05); *H04N 13/346* (2018.05); *H04N 13/361* (2018.05)

(58) Field of Classification Search
CPC .. H04N 13/334; H04N 13/324; H04N 13/344; H04N 13/361; H04N 13/346
See application file for complete search history.

(56) References Cited

U.S. PATENT DOCUMENTS

| | | | |
|---|---|---|---|
| 6,005,649 A | * | 12/1999 | Krusius ............... G02F 1/13336 349/20 |
| 10,700,048 B2 | | 6/2020 | Zhang et al. |

(Continued)

FOREIGN PATENT DOCUMENTS

| | | |
|---|---|---|
| CN | 105842845 A | 8/2016 |
| CN | 106373495 A | 2/2017 |

(Continued)

OTHER PUBLICATIONS

Extended European Search Report in European Appln No. 21957863.0, dated Sep. 23, 2024, 15 pages.

(Continued)

*Primary Examiner* — Anne M Hines
(74) *Attorney, Agent, or Firm* — Fish & Richardson P.C.

(57) ABSTRACT

Examples of a projection optical engine, an electronic device, and a projection imaging method are described. One example of a light combination apparatus is configured to combine light emitted by one pixel of a first color and light emitted by one pixel of a second color, and then emit combined light. The light emitted by the light combination apparatus is imaged on an imaging plane after passing through a pixel expansion apparatus and an optical engine lens. The pixel expansion apparatus is configured to enable the light emitted by the light combination apparatus to be imaged at different locations on the imaging plane at different moments.

20 Claims, 14 Drawing Sheets

(51) Int. Cl.
　　　*H04N 13/344*　　(2018.01)
　　　*H04N 13/346*　　(2018.01)
　　　*H04N 13/361*　　(2018.01)

(56) References Cited

U.S. PATENT DOCUMENTS

| | | |
|---|---|---|
| 2001/0024326 A1 | 9/2001 | Nakamura et al. |
| 2011/0234650 A1 | 9/2011 | Watanabe |
| 2018/0307129 A1 | 10/2018 | Shin et al. |
| 2019/0066553 A1 | 2/2019 | Ohkoba |
| 2019/0278102 A1 | 9/2019 | Suter et al. |
| 2023/0008318 A1* | 1/2023 | Diao .................. H04N 13/383 |

FOREIGN PATENT DOCUMENTS

| | | | |
|---|---|---|---|
| CN | 109557757 A | 4/2019 |
| CN | 109976079 A | 7/2019 |
| CN | 110855968 A | 2/2020 |
| JP | H07113998 A | 5/1995 |
| JP | 2008209476 A | 9/2008 |
| JP | 2021124544 A | 8/2021 |

OTHER PUBLICATIONS

International Search Report and Written Opinion in International Appln. No. PCT/CN2021/120230, mailed on Jun. 27, 2022, 19 pages (with English translation).

* cited by examiner

PROJECTION OPTICAL ENGINE, ELECTRONIC DEVICE, AND PROJECTION IMAGING METHOD

CROSS-REFERENCE TO RELATED APPLICATION

This application is a continuation of International Application No. PCT/CN2021/120230, filed on Sep. 24, 2021, the disclosure of which is hereby incorporated by reference in its entirety.

TECHNICAL FIELD

This application relates to the field of electronic device technologies, and in particular, to a projection optical engine, an electronic device, and a projection imaging method.

BACKGROUND

With rapid development of electronic devices, an electronic device based on projection display gradually develops toward miniaturization. Augmented reality (AR) is a display technology that collects real-world information in real time, and combines virtual information, an image and the like with the real world. An AR device, for example, AR glasses, usually includes a miniature optical engine (optical engine) and an optical combiner (optical combiner). The optical engine is actually a projection optical engine, and is configured to generate an image and transmit the image to the optical combiner. The optical combiner is configured to reflect the image generated by the optical engine to eyes of a user. A volume of the optical engine greatly affects an overall volume of the AR glasses. Therefore, a large volume of the optical engine becomes a limiting factor in miniaturization of the electronic device.

SUMMARY

A projection optical engine, an electronic device, and a projection imaging method are provided, to resolve a limitation of the projection optical engine on miniaturization of the electronic device.

According to a first aspect, a projection optical engine is provided, including: a first display panel, where the first display panel includes a plurality of pixels of a first color, and the pixel of the first color includes an active light-emitting device; a second display panel, where the second display panel includes a plurality of pixels of a second color, and the pixel of the second color includes an active light-emitting device; a light combination apparatus, where the light combination apparatus is configured to combine light emitted by one pixel of the first color and light emitted by one pixel of the second color, and then emit combined light; and a pixel expansion apparatus and an optical engine lens, where the light emitted by the light combination apparatus is imaged on an imaging plane after passing through the pixel expansion apparatus and the optical engine lens. The pixel expansion apparatus is configured to enable the light emitted by the light combination apparatus to be imaged at different locations on the imaging plane at different moments. A total quantity of pixels disposed in the first display panel is less than display resolution of an image formed by the first display panel on the imaging plane, and a total quantity of pixels disposed in the second display panel is less than display resolution of an image formed by the second display panel on the imaging plane.

For the projection optical engine, due to a limitation of the projection optical engine on miniaturization of an electronic device, a display panel architecture with an active light-emitting device needs to be used to reduce a volume of the projection optical engine in a backlight display architecture. If physical resolution of a display panel needs to be ensured, an area of each pixel is required to be smaller, which reduces light-emitting efficiency of the active light-emitting device. If the area of each pixel is increased, the volume of the projection optical engine is also increased. In this solution, it can be ensured that a total area of the display panel remains unchanged, and the area of each pixel is increased, and a resolution loss caused by an increase of the area of the pixel area is compensated by using the pixel expansion apparatus. Light of pixels of different colors is combined by using the light combination apparatus, so that the pixels of different colors can be separately manufactured on different display panels, and there is no need to implement a complex process required for separating the pixels of different colors in plane space, thereby reducing process difficulty. Because the pixels of different colors do not need to be disposed on a same plane, space utilization is improved. In addition, through light combination, sub-pixels originally occupied by two colors can be combined for display in a same region, to improve resolution. On this basis, imaging resolution is further improved by using the pixel expansion apparatus, that is, on a premise that a total light-emitting area of the display panel remains unchanged, and display resolution during imaging remains unchanged, a pixel size is increased, thereby improving the light-emitting efficiency of the active light-emitting device, reducing power consumption, and improving the limitation of the projection optical engine on the miniaturization of the electronic device.

In a possible implementation, the projection optical engine further includes a third display panel. The third display panel includes a plurality of pixels of a third color, and the pixel of the third color includes an active light-emitting device. The light combination apparatus is configured to combine the light emitted by one pixel of the first color, the light emitted by one pixel of the second color, and light emitted by one pixel of the third color, and then emit combined light.

In a possible implementation, the light combination apparatus includes a first dichroic reflective surface. The first dichroic reflective surface is configured to reflect light emitted by the first display panel, so that the light emitted by the first display panel is reflected and then emitted on an emergent surface of the light combination apparatus. The light combination apparatus further includes a second dichroic reflective surface. The second dichroic reflective surface is configured to reflect light emitted by the second display panel, so that the light emitted by the second display panel is reflected and then emitted on the emergent surface of the light combination apparatus. On the emergent surface of the light combination apparatus, the light emitted by the first display panel, the light emitted by the second display panel, and light emitted by the third display panel are all emitted in a same direction. That is, light combination of a plurality of display panels may be implemented in a small volume.

In a possible implementation, the light combination apparatus includes a light-combining prism. The light-combining prism includes a first incident surface, a second incident surface, a third incident surface, and the emergent surface. The first incident surface is opposite to the second incident surface, and the third incident surface is opposite to the emergent surface. A light-emitting surface of the first display panel faces the first incident surface of the light-combining prism, a light-emitting surface of the second display panel faces the second incident surface of the light-combining prism, and a light-emitting surface of the third display panel faces the third incident surface of the light-combining prism. The first dichroic reflective surface and the second dichroic reflective surface are disposed inside the light-combining prism, and the first dichroic reflective surface and the second dichroic reflective surface are disposed in a cross manner. The space utilization of the light combination apparatus can be further improved.

In a possible implementation, a cross section of the light-combining prism is a square. Four sides of the square respectively correspond to the first incident surface, the second incident surface, the third incident surface, and the emergent surface. Two diagonals of the square respectively correspond to the first dichroic reflective surface and the second dichroic reflective surface.

In a possible implementation, the pixel of the first color is a blue pixel, the pixel of the second color is a red pixel, and the pixel of the third color is a green pixel. The first dichroic reflective surface is a blue dichroic reflective surface, and the second dichroic reflective surface is a red dichroic reflective surface.

In a possible implementation, the first display panel further includes a plurality of pixels of a third color, and the pixel of the third color includes an active light-emitting device. Pixels of two colors are simultaneously disposed on the first display panel, so that a color pixel formed by pixels of three colors may be implemented by disposing only two display panels. In this way, both a quantity of display panels in the projection optical engine and a difficulty in producing the light combination apparatus in the projection optical engine including the pixels of the three colors are reduced, and only light combination between the two panels needs to be considered.

In a possible implementation, the light combination apparatus is configured to overlap light emitted by a same pixel of the second color with the light emitted by one pixel of the first color and light emitted by one pixel of the third color, and emit overlapped light. The light emitted by the pixel of the second color is overlapped with the light emitted by the pixel of the first color and the light emitted by the pixel of the third color, to improve display effect of a color pixel formed by light of three colors.

In a possible implementation, the light combination apparatus includes a dichroic reflective surface. The dichroic reflective surface is configured to reflect light emitted by the first display panel, so that the light emitted by the first display panel is reflected and then emitted on an emergent surface of the light combination apparatus. On the emergent surface of the light combination apparatus, both the light emitted by the first display panel and light emitted by the second display panel are emitted in a same direction.

In a possible implementation, the pixel of the first color is a green pixel, the pixel of the second color is a red pixel, and the pixel of the third color is a blue pixel. The dichroic reflective surface is configured to enable red light to pass through, and reflect blue light and green light. The green pixel and the blue pixel are disposed on a same display panel, and the red pixel is disposed on another display panel. In this way, when the light combination apparatus is disposed, light combination on the two panels can be implemented by disposing only one dichroic reflective surface, and costs are low.

In a possible implementation, the pixel expansion apparatus includes a refraction plate and a control component. The control component is configured to enable the refraction plate to rotate to different postures, and the refraction plate is located between the light combination apparatus and the optical engine lens.

When the refraction plate is in different postures, the light emitted by the light combination apparatus is refracted to different locations on the imaging plane for imaging after passing through the refraction plate.

In a possible implementation, the control component is configured to enable the refraction plate to rotate along a first axis and rotate along a second axis, where the first axis is perpendicular to the second axis, to implement pixel offset in each direction, and facilitate pixel expansion.

In a possible implementation, the control component is configured to enable the refraction plate to cyclically rotate to a first posture, a second posture, a third posture, and a fourth posture. When the refraction plate is in the first posture, the light emitted by the light combination apparatus is imaged in a first location region on the imaging plane. When the refraction plate is in the second posture, the light emitted by the light combination apparatus is imaged in a second location region on the imaging plane, where the second location region is offset relative to the first location region in a first direction. When the refraction plate is in the third posture, the light emitted by the light combination apparatus is imaged in a third location region on the imaging plane, where the third location region is offset relative to the second location region in a second direction, and the second direction is perpendicular to the first direction. When the refraction plate is in the fourth posture, the light emitted by the light combination apparatus is imaged in a fourth location region on the imaging plane, where the fourth location region is offset relative to the third location region in a third direction, the first location region is offset relative to the fourth location region in a fourth direction, the third direction is opposite to the first direction, and the fourth direction is opposite to the second direction. A same pixel is imaged at four locations at different moments, so that a quantity of pixels can be quadrupled.

In a possible implementation, a pixel size of the pixel of the first color is less than 10 μm, and a pixel size of the pixel of the second color is less than 10 μm.

In a possible implementation, the pixel of the first color includes a micro light-emitting diode micro LED of a first color, and the pixel of the second color includes a micro LED of a second color; or, the pixel of the first color includes a micro LED and a first color light conversion layer located on a light-emitting side of the micro LED, and the pixel of the second color includes a micro LED and a second color light conversion layer located on a light-emitting side of the micro LED; or the pixel of the first color includes a micro organic light-emitting diode micro OLED of a first color, and the pixel of the second color includes a micro OLED of a second color.

According to a second aspect, an electronic device is provided, including the foregoing projection optical engine.

In a possible implementation, the electronic device is augmented reality AR glasses.

According to a third aspect, a projection imaging method is provided. The method is applied to a projection optical engine. The projection optical engine includes: a first display panel, where the first display panel includes a plurality of pixels of a first colors, and the pixel of the first color includes an active light-emitting device; a second display panel, where the second display panel includes a plurality of pixels of a second color, and the pixel of the second color includes an active light-emitting device; and a light combination apparatus, a pixel expansion apparatus, and an optical engine lens. The projection imaging method includes: combining, by using the light combination apparatus, light emitted by the pixel of the first color and light emitted by the pixel of the second color, and then emitting combined light. The projection optical engine works in a plurality of cycles, and each cycle includes a first moment and a second moment. At the first moment, the light emitted by the light combination apparatus is imaged in a first location region on an imaging plane after passing through the pixel expansion apparatus and the optical engine lens. At the second moment, the light emitted by the light combination apparatus is imaged in a second location region on the imaging plane after passing through the pixel expansion apparatus and the optical engine lens. The second location region is offset relative to the first location region.

In a possible implementation, the projection optical engine further includes a third display panel. The third display panel includes a plurality of pixels of a third color, and the pixel of the third color includes an active light-emitting device. The method further includes: combining, by using the light combination apparatus, the light emitted by the pixel of the first color, the light emitted by the pixel of the second color, and light emitted by the pixel of the third color, and then emitting combined light.

In a possible implementation, the light combination apparatus includes a first dichroic reflective surface and a second dichroic reflective surface. In the light combination apparatus, the light emitted by the pixel of the first color is reflected on the first dichroic reflective surface and passes through the second dichroic reflective surface, the light emitted by the pixel of the second color is reflected on the second dichroic reflective surface and passes through the first dichroic reflective surface, and the light emitted by the pixel of the third color passes through the first dichroic reflective surface and the second dichroic reflective surface. On an emergent surface of the light combination apparatus, the light emitted by the pixel of the first color, the light emitted by the pixel of the second color, and the light emitted by the pixel of the third color are combined, and then light is emitted.

In a possible implementation, the first display panel further includes a plurality of pixels of a third color, and the pixel of the third color includes an active light-emitting device. In the light combination apparatus, light emitted by a same pixel of the second color is overlapped with the light emitted by the pixel of the first color and light emitted by the pixel of the third color, and light is emitted.

In a possible implementation, the light combination apparatus includes a dichroic reflective surface. In the light combination apparatus, the light emitted by the pixel of the first color and the light emitted by the pixel of the third color are reflected on the dichroic reflective surface, and the light emitted by the pixel of the second color passes through the dichroic reflective surface. On an emergent surface of the light combination apparatus, a part of the light emitted by the pixel of the second color and the light emitted by the pixel of the first color are combined, and then light is emitted; and the other part of the light emitted by the pixel of the second color and the light emitted by the pixel of the third color are combined, and then light is emitted.

In a possible implementation, the pixel expansion apparatus includes a refraction plate and a control component. The refraction plate is located between the light combination apparatus and the optical engine lens. At the first moment, the control component controls the refraction plate to rotate to a first posture, and the light emitted by the light combination apparatus is refracted to the first location region on the imaging plane for imaging after passing through the refraction plate in the first posture. At the second moment, the control component controls the refraction plate to rotate to a second posture, and the light emitted by the light combination apparatus is refracted to the second location region on the imaging plane for imaging after passing through the refraction plate in the second posture.

In a possible implementation, each cycle sequentially includes the first moment, the second moment, a third moment, and a fourth moment. At the first moment, the control component controls the refraction plate to rotate to the first posture, and the light emitted by the light combination apparatus is refracted to the first location region on the imaging plane for imaging after passing through the refraction plate in the first posture. At the second moment, the control component controls the refraction plate to rotate to the second posture, and the light emitted by the light combination apparatus is refracted to the second location region on the imaging plane for imaging after passing through the refraction plate in the second posture, where the second location region is offset relative to the first location region in a first direction. At the third moment, the control component controls the refraction plate to rotate to a third posture, and the light emitted by the light combination apparatus is refracted to a third location region on the imaging plane for imaging after passing through the refraction plate in the third posture, where the third location region is offset relative to the second location region in a second direction, and the second direction is perpendicular to the first direction. At the fourth moment, the control component controls the refraction plate to rotate to a fourth posture, and the light emitted by the light combination apparatus is refracted to a fourth location region on the imaging plane for imaging after passing through the refraction plate in the fourth posture, where the fourth location region is offset relative to the third location region in a third direction, the first location region is offset relative to the fourth location region in a fourth direction, the third direction is opposite to the first direction, and the fourth direction is opposite to the second direction.

DESCRIPTION OF EMBODIMENTS

Terms used in embodiments of this application are only used to explain specific embodiments of this application, but are not intended to limit this application.

Before embodiments of this application are described, a conventional technology and a problem of the conventional technology are first described.

A common architecture of a projection optical engine is a backlight source in cooperation with a spatial modulator, for example, a digital light processing (DLP) technology or a liquid crystal on silicon (LCoS) projection technology is applied. However, both the DLP technology and the LCoS projection technology require complex light source elements and systems such as a backlight source and a uniform light device, resulting in a large overall volume of the projection optical engine. In another conventional technology, an architecture based on an active light-emitting display panel is used, for example, a micro light-emitting diode (LED) display panel or a micro organic light-emitting diode (OLED) display panel. The active light-emitting display panel implements display by actively emitting light by a light-emitting device, and does not need a backlight source, a uniform light device, and the like. Compared with the technology using the backlight source, the projection optical engine has a smaller volume.

Figure 1:
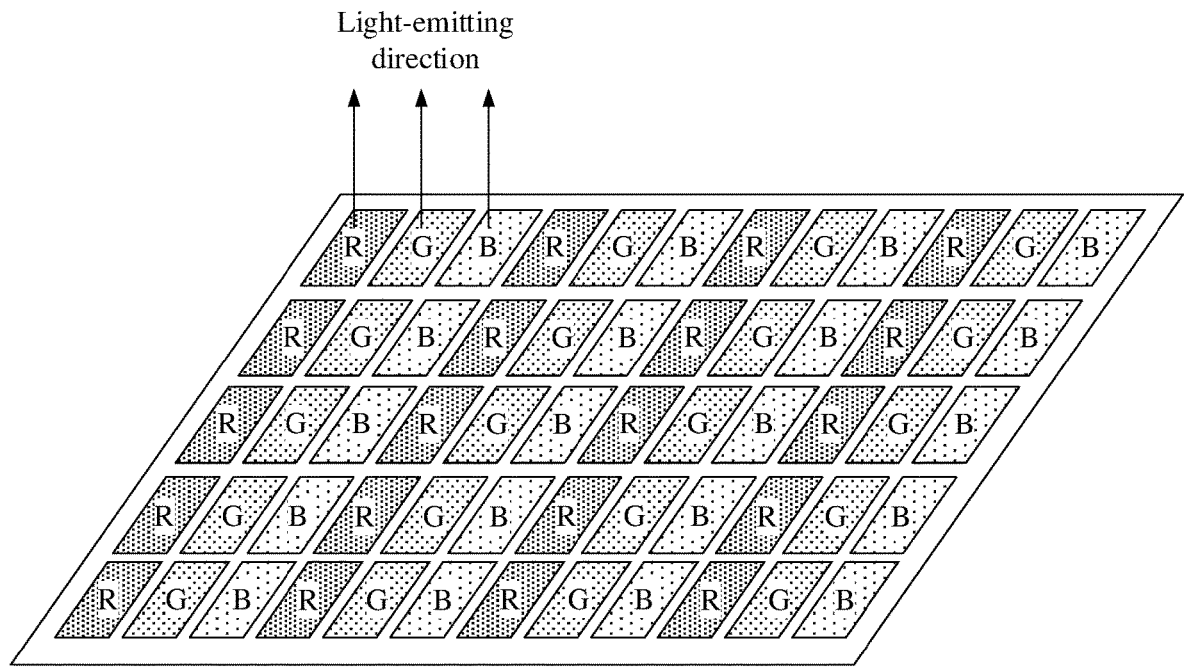
FIG. 1 is a schematic diagram of a structure of an active light-emitting display panel in a conventional technology.

As shown in FIG. 1, a full-color active light-emitting display panel may be directly used in the projection optical engine, where each pixel is formed by spatially separated red R, green G, and blue B sub-pixels. Because resolution of a human eye is limited, when sub-pixel sizes are sufficiently small, the human eye cannot distinguish the spatially separated RGB sub-pixels, but consider the three sub-pixels as a full-color pixel to implement full-color display. In the projection optical engine, light emitted by a display panel may be projected through a lens.

First, a description is provided based on the micro LED display panel. For a production process, due to a characteristic of an LED material, an LED light-emitting device needs to be epitaxially grown on a special substrate (for example, a sapphire substrate), and LEDs of different colors need to be grown and produced separately due to different light-emitting materials; and then the RGB sub-pixels are separately transferred to a target circuit substrate by using a mass transfer technology. This leads to high complexity and low yield of an entire processing technology. To avoid a process needing a plurality of mass transfers, another production process is first producing a single-color micro LED light-emitting panel (for example, a blue light-emitting device) by using a mature process, where a quantity of pixels of the blue light-emitting device is three times a quantity of target display pixels, and then producing, with a sub-pixel size, a light conversion material at a corresponding location by using a special process, for example, a green quantum dot material is produced above a corresponding blue light-emitting device, and a red quantum dot material is produced above a corresponding blue light-emitting device. In a display process, light emitted by the blue light-emitting device performs photoexcitation on the light conversion material, so that the green quantum dot material displays green, and the red quantum dot material displays red, thereby implementing display of three sub-pixel colors: red, green, and blue, and implementing full-color display effect.

In addition, for the micro OLED display panel, a full-color display panel may be directly produced by using a conventional process like evaporation or inkjet printing.

However, for both the micro LED display panel and the micro OLED display panel, display resolution is one third of sub-pixel resolution due to spatial separation, and therefore, a resolution loss is caused. When the sub-pixel size is fixed (a minimum sub-pixel size is usually limited by the processing technology and performance), actual display resolution is sacrificed, for example, for 1920×1080 sub-pixels, only 1920×1080/3 pixel resolution is actually displayed. Alternatively, a quantity of sub-pixels is increased, for example, the quantity of sub-pixels is increased to 1920× 1080×3 to display pixel resolution 1920×1080. However, when the sub-pixel size cannot be reduced, a size of the display panel is increased, thereby increasing the volume of the projection optical engine.

Figure 2:
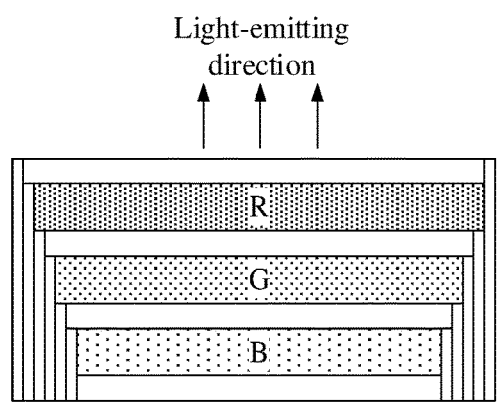
FIG. 2 is a schematic diagram of a structure of another active light-emitting display panel in a conventional technology.

To further resolve a process limitation of a full-color micro LED display panel using spatial separation and a mutual constraint between resolution and a volume, in a conventional technology, as shown in FIG. 2, the RGB sub-pixels are no longer sub-pixels separated in plane space, but are stacked in a vertical direction, and light is guided out of the panel through a light guiding structure at a pixel edge, to implement upward light emission. An advantage of this solution is that color sub-pixels are stacked in vertical space, and no area in a plane direction is sacrificed, and therefore, actually displayed resolution is consistent with a quantity of pixels in the plane direction, and no resolution is sacrificed. However, a process of this solution involves vertical stacking of the RGB sub-pixels and a side wall light guiding structure, and a process difficulty is high.

Figure 3:
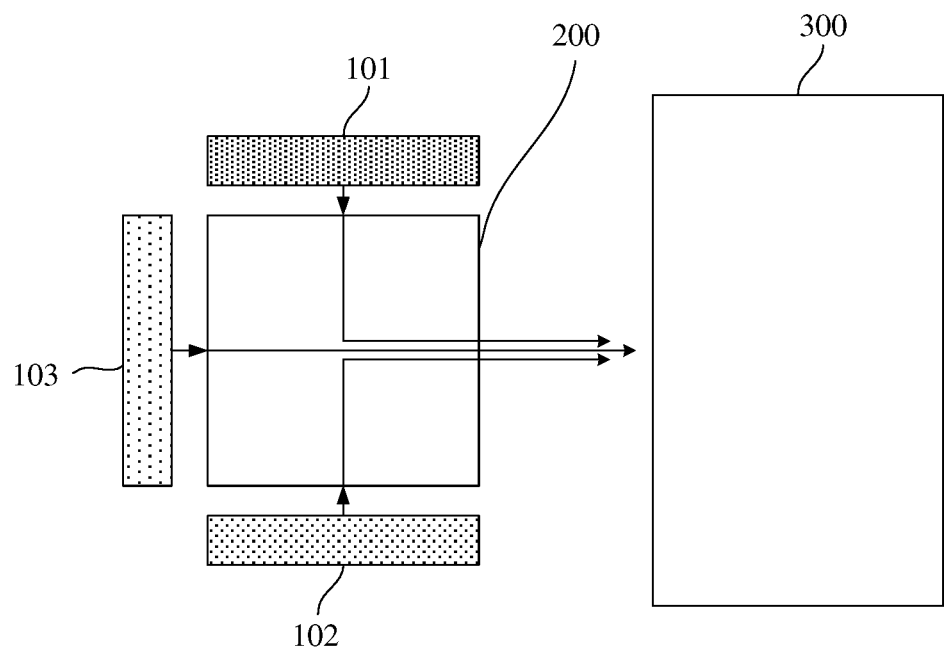
FIG. 3 is a schematic diagram of a structure for combining three single-color light-emitting units in a conventional technology.

For the foregoing problem, as shown in FIG. 3, in another conventional technology, three single-color active light-emitting units are used, including a red light-emitting unit 101, a blue light-emitting unit 102, and a green light-emitting unit 103. Light combination is performed through a light-combining prism 200, to emit color light, and then projection is performed through a lens 300, so that high display resolution can be implemented in a small volume.

Figure 4:
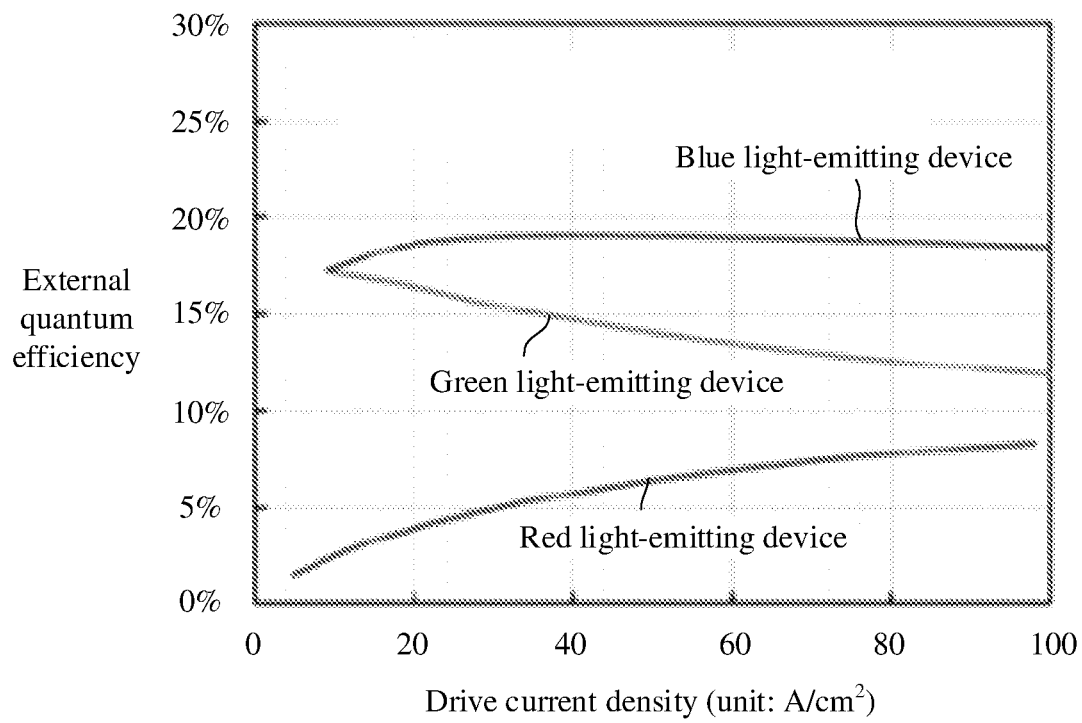
FIG. 4 is a schematic diagram of external quantum efficiency curves of micro LEDs of three colors: R, G, and B with a diameter of 6 μm.
Figure 5:
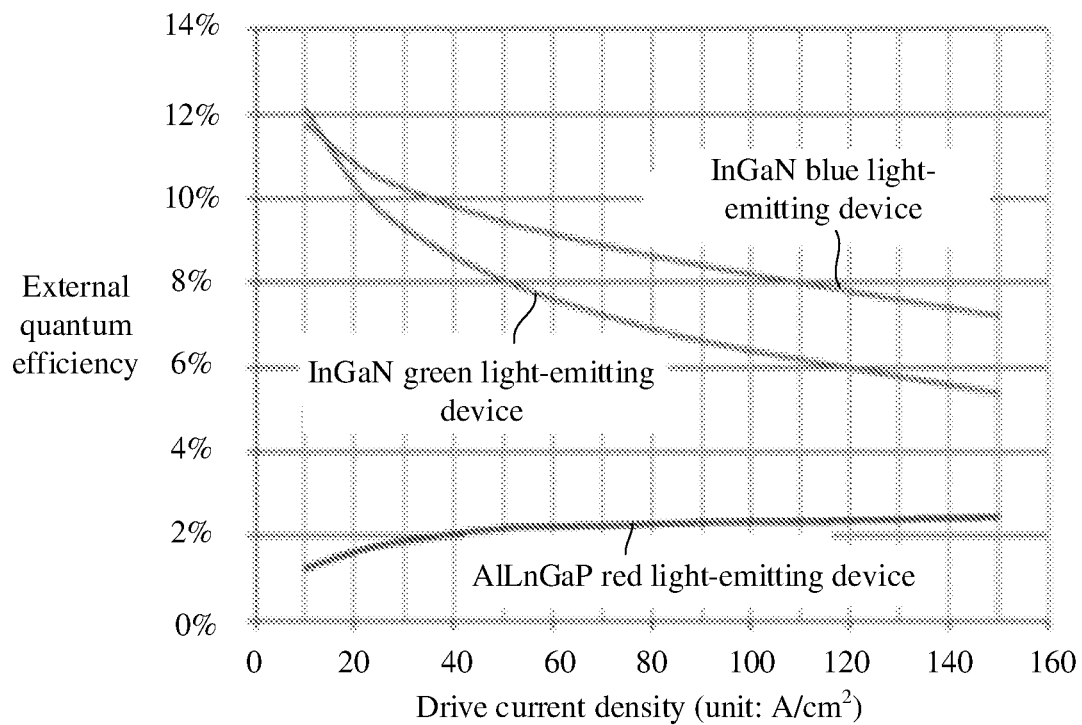
FIG. 5 is external quantum efficiency of micro LEDs of three colors: R, G, and B with a diameter of 1.7 μm.

Based on this solution in which the active light-emitting unit cooperates with the light-combining prism, to ensure a small volume of the projection optical engine, an overall size of the display panel is expected to be as small as possible, and to ensure the high display resolution, a size of the light-emitting device is expected to be as small as possible. However, as the size of the LED light-emitting device decreases, light-emitting efficiency (optical power/electric power) of a micron-level micro LED decreases with a decrease in a pixel size. As shown in FIG. 4, in the view of a drive current density 70 A/cm$^2$, external quantum efficiency of micro LEDs of three colors: R, G, and B with a diameter of 6 μm is 8%, 13%, and 18%. As shown in FIG. 5, external quantum efficiency of micro LEDs of three colors: R, G, and B with a diameter of 1.7 μm is 2%, 7%, and 9%. It can be learned that, as the pixel size decreases, electro-optical conversion efficiency greatly decreases. However, in an electronic product, there is a high requirement for a small volume of an entire projection optical engine, which means that a battery capacity that can be provided is small. To ensure a specific battery life, power consumption of a display system is required to be low. Therefore, in an optical engine solution using a full-color micro LED, when a battery capacity is fixed, a small volume of the optical engine, high resolution, and a long battery life are in a mutual constraint relationship, and cannot be met at the same time.

The following describes technical solutions in embodiments of this application.

Figure 6:
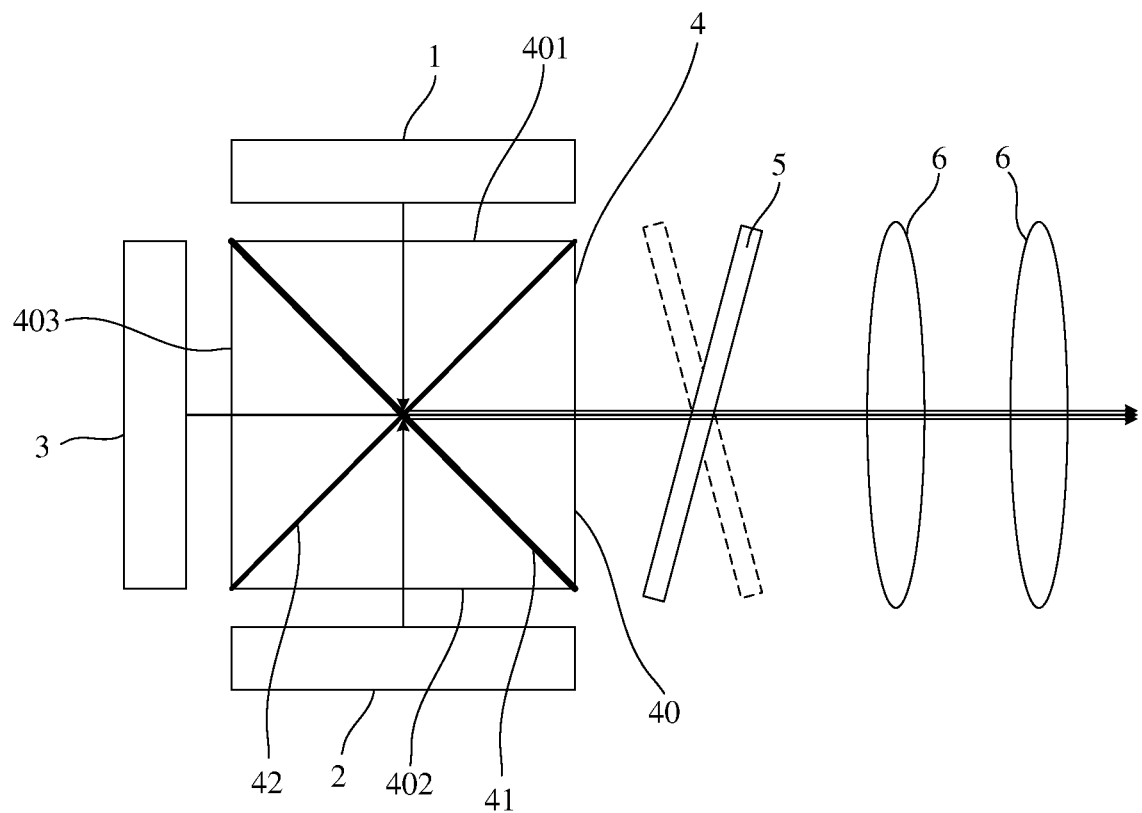
FIG. 6 is a schematic diagram of a structure of a projection optical engine according to an embodiment of this application.
Figure 7:
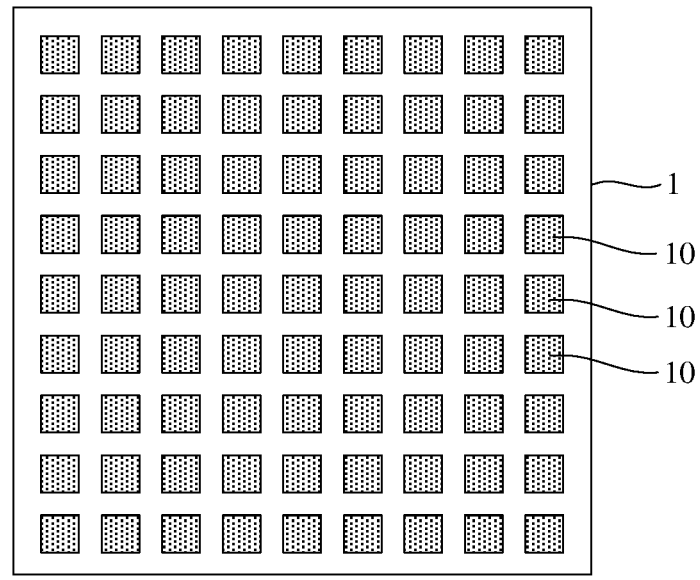
FIG. 7 is a schematic diagram of a structure of a first display panel in FIG. 6.
Figure 8:
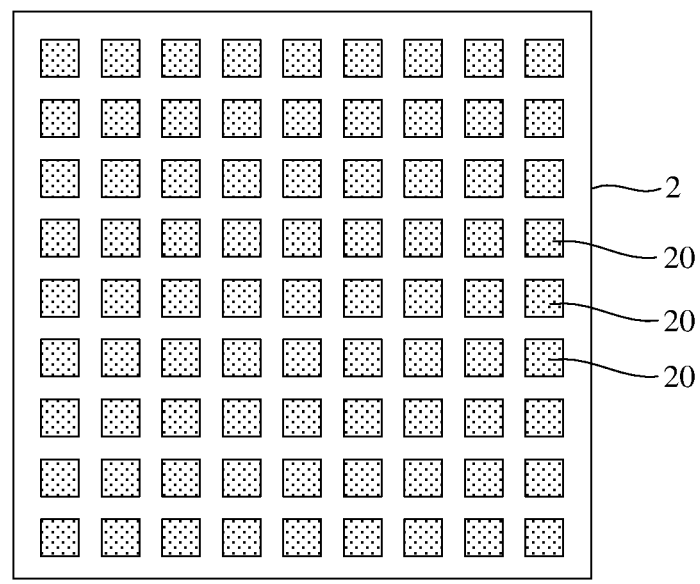
FIG. 8 is a schematic diagram of a structure of a second display panel in FIG. 6.

As shown in FIG. 6, an embodiment of this application provides a projection optical engine, including: a first display panel 1, a second display panel 2, a light combination apparatus 4, a pixel expansion apparatus 5, and an optical engine lens 6. As shown in FIG. 7, the first display panel 1 includes a plurality of pixels 10 of a first color, the plurality of pixels 10 of the first color are distributed in a matrix, the pixel of the first pixel 10 of the first color includes an active light-emitting device, and the active light-emitting device may be, for example, a micro LED or a micro OLED. As shown in FIG. 8, the second display panel 2 includes a plurality of pixels 20 of a second color, the pixel 20 of the second color includes an active light-emitting device, and the first color and the second color are different colors. The light combination apparatus 4 is configured to combine light emitted by one pixel of the first one pixel 10 of the first color and light emitted by one pixel 20 of the second color, and then emit combined light. The plurality of pixels 10 of the first color in the first display panel 1 and the plurality of pixels 20 of the second color in the second display panel 2 may be in a one-to-one correspondence to form a pixel group, and each pixel group includes one corresponding pixel 10 of the first color and one corresponding pixel 20 of the second color. After passing through the light combination apparatus 4, the light emitted by the pixel 10 of the first color and the light emitted by the pixel 20 of the second color in a same pixel group are combined, and then light is emitted. Because the light emitted by the pixel 10 of the first color and the light emitted by the pixel 20 of the second color have different colors, after the light emitted by the pixel 10 of the first color and the light emitted by the pixel 20 of the second color are combined, a color may be formed due to overlapping of the light of different colors, to implement color display. The light emitted by the light combination apparatus 4 is imaged on an imaging plane after passing through the pixel expansion apparatus 5 and the optical engine lens 6. The imaging plane may be at infinity of the optical engine lens 6. When the projection optical engine is used in, for example, AR glasses, light of the projection optical engine passing through the optical engine lens 6 may be further reflected into an eye of a user through a light guiding structure, so that the user can watch, through the AR glasses, an image projected and displayed by the projection optical engine.

An embodiment of this application further provides a projection imaging method in which the foregoing projection optical engine may be used. The projection imaging method includes:

combining, by using a light combination apparatus 4, light emitted by a pixel 10 of a first color and light emitted by a pixel 20 of a second color, and then emitting combined light.

The projection optical engine works in a plurality of cycles, and each cycle includes a first moment t1 and a second moment t2.

At the first moment t1, the light emitted by the light combination apparatus 4 is imaged in a first location region on an imaging plane after passing through a pixel expansion apparatus 5 and an optical engine lens 6.

At the second moment t2, the light emitted by the light combination apparatus 4 is imaged in a second location region on the imaging plane after passing through the pixel expansion apparatus 5 and the optical engine lens 6. The second location region is offset relative to the first location region.

Figure 9:
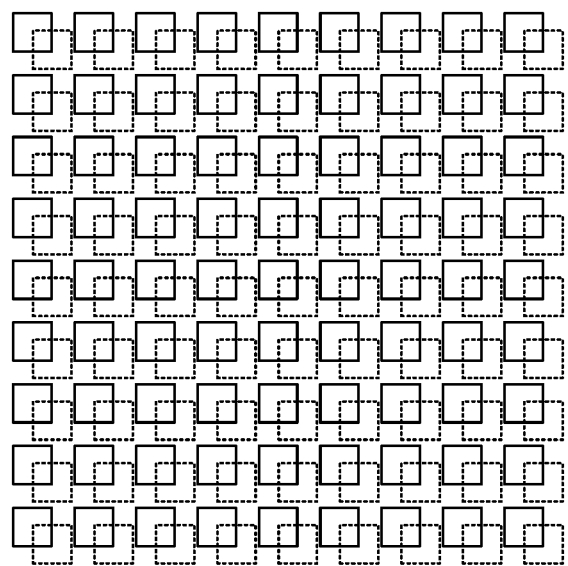
FIG. 9 is a schematic diagram of an imaging plane of the projection optical engine in FIG. 6.

The pixel expansion apparatus 5 is configured to enable the light emitted by the light combination apparatus 4 to be imaged at different locations on the imaging plane at different moments. As shown in FIG. 9, it is assumed that FIG. 9 shows imaging on the imaging plane, where a solid box represents a pixel pattern corresponding to each pixel group on the imaging plane at the moment t1, each pixel pattern is a pattern formed by combining light of one pixel 10 of the first color and light of one pixel 20 of the second color, and a dashed box represents a pixel pattern corresponding to each pixel group on the imaging plane at the moment t2. It can be learned that, at two different moments, a location of the pixel pattern is offset, that is, a new pixel location is generated on the imaging plane by using the pixel expansion apparatus 5 based on an actual pixel, so that resolution expansion is implemented. For example, if the pixel expansion apparatus 5 cyclically switches the imaging plane between states corresponding to the moment t1 and the moment t2, a quantity of pixels can be doubled. One pixel 10 of the first color and one pixel 20 of the second color form a pixel group, and light emitted by the pixel 10 of the first color and light emitted by the pixel 20 of the second color are combined, and then light is emitted, to form one pixel pattern on the imaging plane. An actual pixel may be reused at different moments by using the pixel expansion apparatus 5, so that the actual pixel is imaged at different locations on the imaging plane at different moments, and pixel expansion is implemented. For example, if the actual pixel is cyclically switched between two locations on the imaging plane, the quantity of pixels can be doubled. A total quantity of pixels disposed in a first display panel 1 is less than display resolution of an image formed by the first display panel 1 on the imaging plane, and a total quantity of pixels disposed in a second display panel 2 is less than display resolution of an image formed by the second display panel 2 on the imaging plane. If only the pixel 10 of the first color is disposed in the first display panel 1, the total quantity of pixels disposed in the first display panel 1 is a total quantity of pixels 10 of the first color in the first display panel 1, and is assumed to be 1024×1080. Similarly, if only the pixel 20 of the second color is disposed in the second display panel 2, the total quantity of pixels disposed in the second display panel 2 is a total quantity of pixels 20 of the second color in the second display panel 2, and is assumed to be 1024×1080. For example, if the actual pixel is cyclically switched between two locations on the imaging plane, the quantity of pixels can be doubled, that is, display resolution of imaging on the imaging plane is 2048×2160, that is, the display resolution of the image formed by the first display panel 1 on the imaging plane is 2048×2160, and the display resolution of the image formed by the second display panel 2 on the imaging plane is 2048×2160.

If imaging is directly performed without using the pixel expansion apparatus, a quantity of physical pixels of a display panel is imaging resolution. It is assumed that a total light-emitting area of all pixels of the display panel is P, and a total quantity of physical pixels is 2048×2160. In this case, corresponding imaging resolution is 2048×2160, and a pixel size is K. In the technical solutions in embodiments of this application, the pixel expansion apparatus 5 is used for imaging. It is assumed that a total light-emitting area of the first display panel is also P, and corresponding imaging resolution is 2048×2160. Because the pixel expansion apparatus 5 is used, the total quantity of pixels of the first display panel is less than 2048×2160, that is, a pixel size is greater than K. Because the pixel size is increased, for an active light-emitting device, for example, a micro LED, light-emitting efficiency of the light-emitting device can be effectively improved, thereby reducing power consumption, that is, the pixel size is increased without changing a size of the display panel and reducing the imaging resolution, thereby improving the light-emitting efficiency of the light-emitting device and reducing the power consumption.

According to the projection optical engine in embodiments of this application, light of pixels of different colors is combined by using the light combination apparatus, so that the pixels of different colors can be separately manufactured on different display panels, and there is no need to implement a complex process required for separating the pixels of different colors in plane space, thereby reducing process difficulty. Because the pixels of different colors do not need to be disposed on a same plane, space utilization is improved. In addition, through light combination, sub-pixels originally occupied by two colors can be combined for display in a same region, to improve resolution. On this basis, the imaging resolution is further improved by using the pixel expansion apparatus, that is, on a premise that a total light-emitting area of the display panel remains unchanged, and display resolution during imaging remains unchanged, the pixel size is increased, thereby improving the light-emitting efficiency of the active light-emitting device, reducing the power consumption, and improving a limitation of the projection optical engine on miniaturization of an electronic device.

Figure 10:
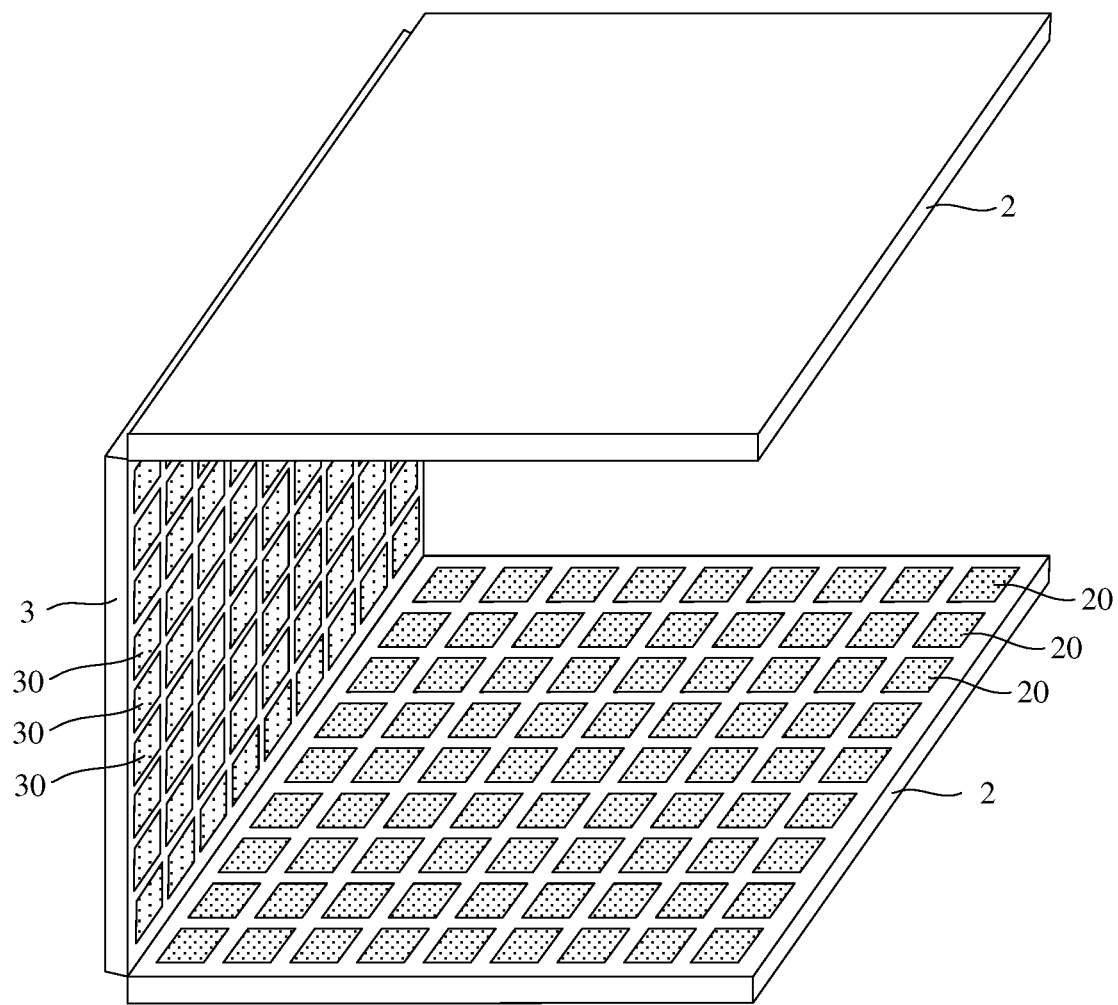
FIG. 10 is a schematic diagram of a three-dimensional structure of three display panels in FIG. 6.
Figure 11:
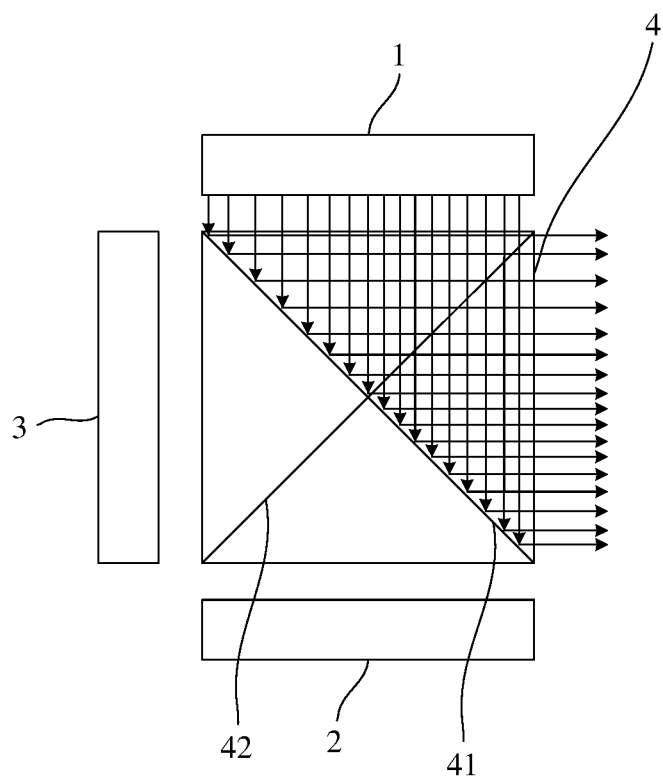
FIG. 11 is a schematic diagram of a state in which light of a first display panel in FIG. 6 passes through a light combination apparatus.
Figure 12:
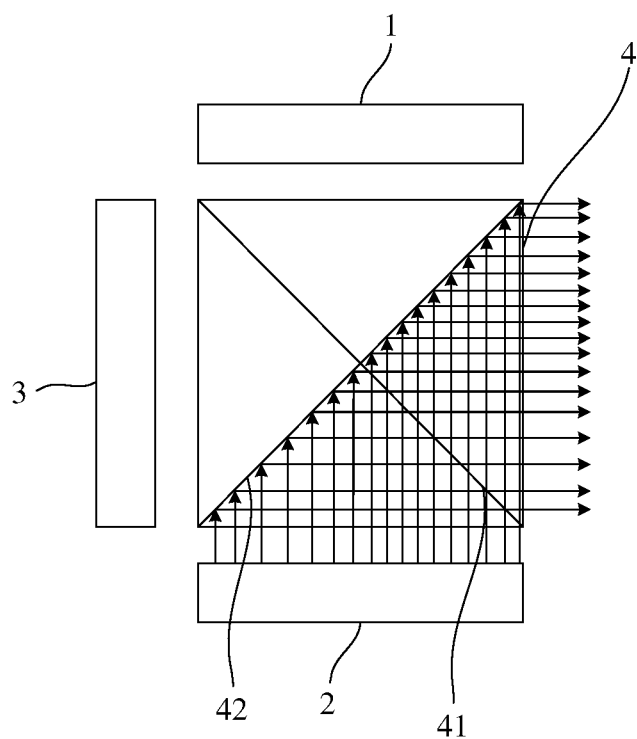
FIG. 12 is a schematic diagram of a state in which light of a second display panel in FIG. 6 passes through a light combination apparatus.
Figure 13:
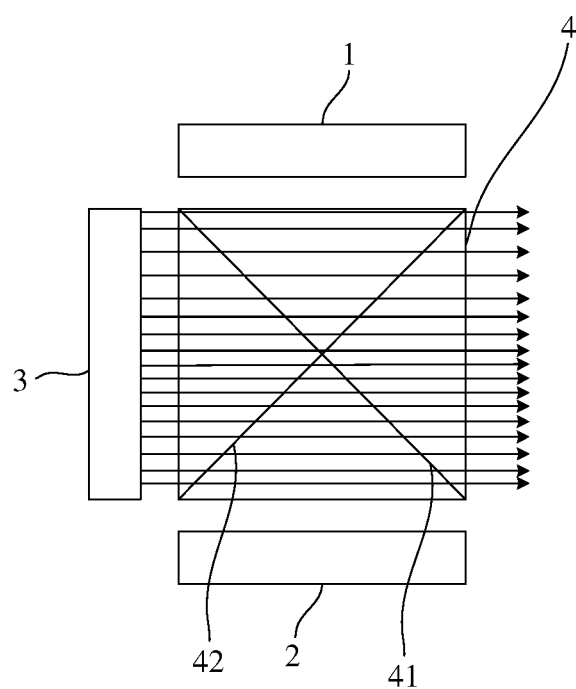
FIG. 13 is a schematic diagram of a state in which light of a third display panel in FIG. 6 passes through a light combination apparatus.
Figure 14:
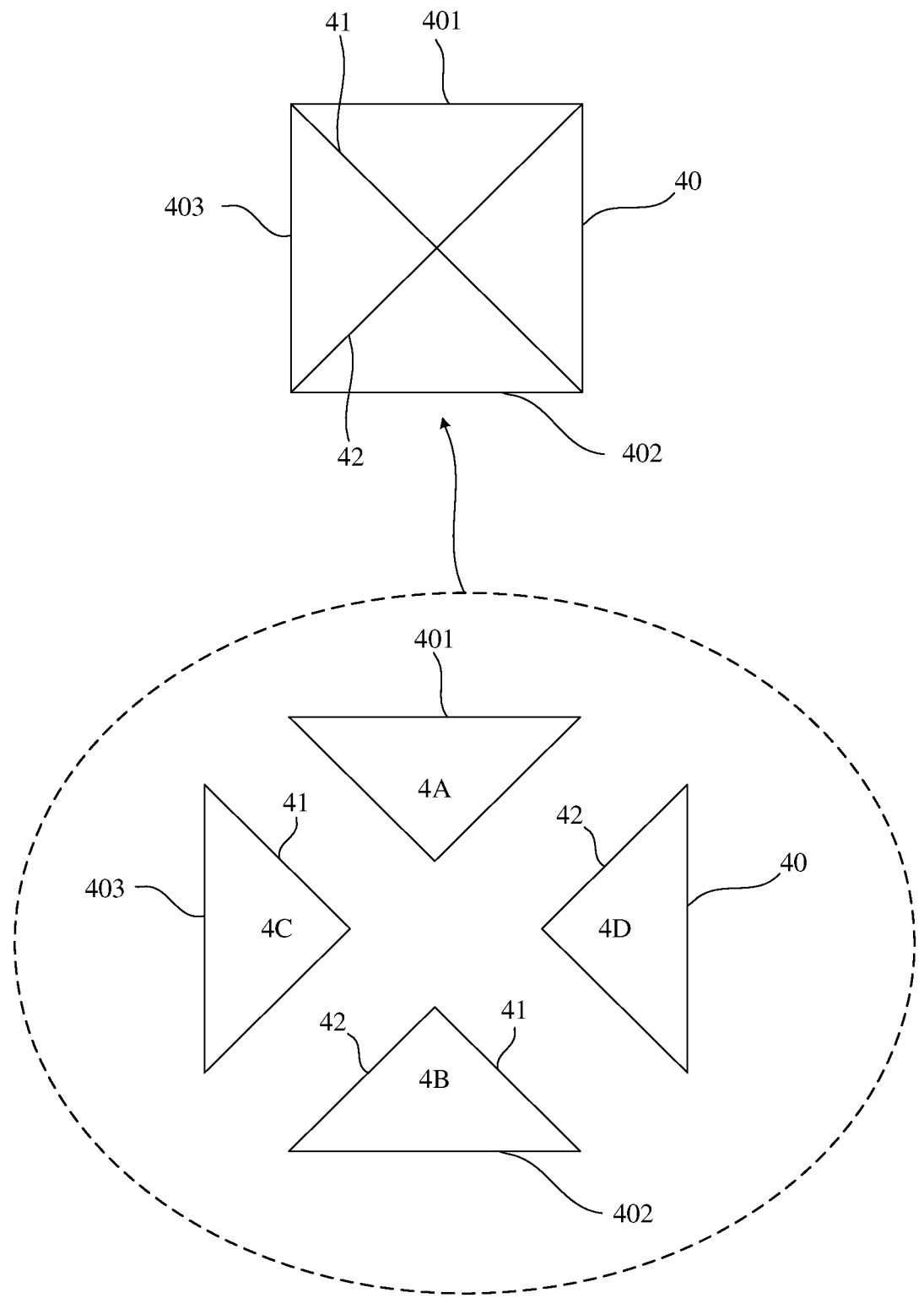
FIG. 14 is a schematic diagram of a structure of a light combination apparatus in FIG. 6.

In a possible implementation, as shown in FIG. 6 and FIG. 10, the projection optical engine further includes a third display panel 3. The third display panel 3 includes a plurality of pixels 30 of a third color, and the pixel 30 of the third color includes an active light-emitting device. The light combination apparatus 4 is configured to combine light emitted by one pixel 10 of the first color, light emitted by one pixel 20 of the second color, and light emitted by one pixel 30 of the third color, and then emit combined light. The projection imaging method further includes: combining, by using the light combination apparatus 4, the light emitted by the pixel 10 of the first color, the light emitted by the pixel 20 of the second color, and the light emitted by the pixel 30 of the third color, and then emitting combined light. In other words, a same pixel group includes one corresponding pixel 10 of the first color, one corresponding pixel 20 of the second color, and one corresponding pixel 30 of the third color. Different pixels 10 of the first color belong to different pixel groups, different pixels 20 of the second color belong to different pixel groups, and different pixels 30 of the third color belong to different pixel groups. Light emitted by the pixel 10 of the first color, the pixel 20 of the second color, and the pixel 30 of the third color in the same pixel group is combined into a same ray of light by using the light combination apparatus 4, so that the light of the three colors is combined into color light, and is imaged as a same pixel. The pixel 10 of the first color, the pixel 20 of the second color, and the pixel 30 of the third color are configured to separately emit light of different colors. For example, the pixel 10 of the first color is a blue pixel, the pixel 20 of the second color is a red pixel, and the pixel 30 of the third color is a green pixel. The pixels of the three colors are separately disposed on three different panels, and by using the light combination apparatus 4, the light of the three colors may be combined, and then light is emitted, to implement color display effect. For each pixel color on the imaging plane, display of the color may be controlled by respective brightness of a blue pixel, a red pixel, and a green pixel corresponding to the color.

In a possible implementation, as shown in FIG. 6, FIG. 11, FIG. 12, and FIG. 13, the light combination apparatus 4 includes a first dichroic reflective surface 41. The first dichroic reflective surface 41 is configured to reflect light emitted by the first display panel 1, so that the light emitted by the first display panel 1 is reflected and then emitted on an emergent surface 40 of the light combination apparatus 4. A dichroic reflective surface is a surface that selects, based on a wavelength, to enable light to pass through or reflect light. For visible light, a color of the light is related to a wavelength. Therefore, the dichroic reflective surface may enable light of some colors to pass through, and reflect light of other colors. For example, the pixel 10 of the first color is a blue pixel, the pixel 20 of the second color is a red pixel, the pixel 30 of the third color is a green pixel, and the first dichroic reflective surface 41 is configured to reflect blue light, and enable green light and red light to pass through. The light combination apparatus 4 further includes a second dichroic reflective surface 42. The second dichroic reflective surface 42 is configured to reflect light emitted by the second display panel 2, so that the light emitted by the second display panel 2 is reflected and then emitted on the emergent surface 40 of the light combination apparatus 4. The second dichroic reflective surface 42 is configured to reflect the red light, and enable the blue light and the green light to pass through. On the emergent surface 40 of the light combination apparatus 4, the light emitted by the first display panel 1, the light emitted by the second display panel 2, and light emitted by the third display panel 3 are all emitted in a same direction, that is, on the emergent surface 40, the light from the three display panels is emitted in parallel. Light from a same pixel group is emitted at a same location, and is used as a same pixel pattern on the imaging plane. That is, light combination of a plurality of display panels may be implemented in a small volume. In the projection imaging method, in the light combination apparatus 4, the light emitted by the pixel 10 of the first color is reflected on the first dichroic reflective surface 41 and passes through the second dichroic reflective surface 42, the light emitted by the pixel 20 of the second color is reflected on the second dichroic reflective surface 42 and passes through the first dichroic reflective surface 41, and the light emitted by the pixel 30 of the third color passes through the first dichroic reflective surface 41 and the second dichroic reflective surface 42. On the emergent surface 40 of the light combination apparatus 4, the light emitted by the pixel 10 of the first color, the light emitted by the pixel 20 of the second color, and the light emitted by the pixel 30 of the third color are combined, and then light is emitted.

In a possible implementation, as shown in FIG. 6, FIG. 11, FIG. 12, FIG. 13, and FIG. 14, the light combination apparatus 4 includes a light-combining prism, the light-combining prism includes a first incident surface 401, a second incident surface 402, a third incident surface 403, and the emergent surface 40. The first incident surface 401 is opposite to the second incident surface 402, and the third incident surface 403 is opposite to the emergent surface 40. A light-emitting surface of the first display panel 1 faces the first incident surface 401 of the light-combining prism, a light-emitting surface of the second display panel 2 faces the second incident surface 402 of the light-combining prism, and a light-emitting surface of the third display panel 3 faces the third incident surface 403 of the light-combining prism. The first dichroic reflective surface 41 and the second dichroic reflective surface 42 are disposed inside the light-combining prism, and the first dichroic reflective surface 41 and the second dichroic reflective surface 42 are disposed in a cross manner. In this structure, space utilization of the entire projection optical engine is high, and the first dichroic reflective surface 41 and the second dichroic reflective surface 42 may be implemented in a coating manner. For example, the light-combining prism may be formed by four discrete prism parts, including a first prism part 4A, a second prism part 4B, a third prism part 4C, and a fourth prism part 4D. A part of coating of the first dichroic reflective surface 41 may be disposed between the first prism part 4A and the third prism part 4C, and the other part of the coating of the first dichroic reflective surface 41 may be disposed between the second prism part 4B and the fourth prism part 4D. A part of coating of the second dichroic reflective surface 42 may be disposed between the first prism part 4A and the fourth prism part 4D, and a part of the coating of the second dichroic reflective surface 42 may be disposed between the second prism part 4B and the third prism part 4C. In this way, after the four prism parts are combined, the first dichroic reflective surface 41 and the second dichroic reflective surface 42 that cross each other may be formed. Space utilization of the light combination apparatus 4 can be further improved through the foregoing structure.

Figure 15:
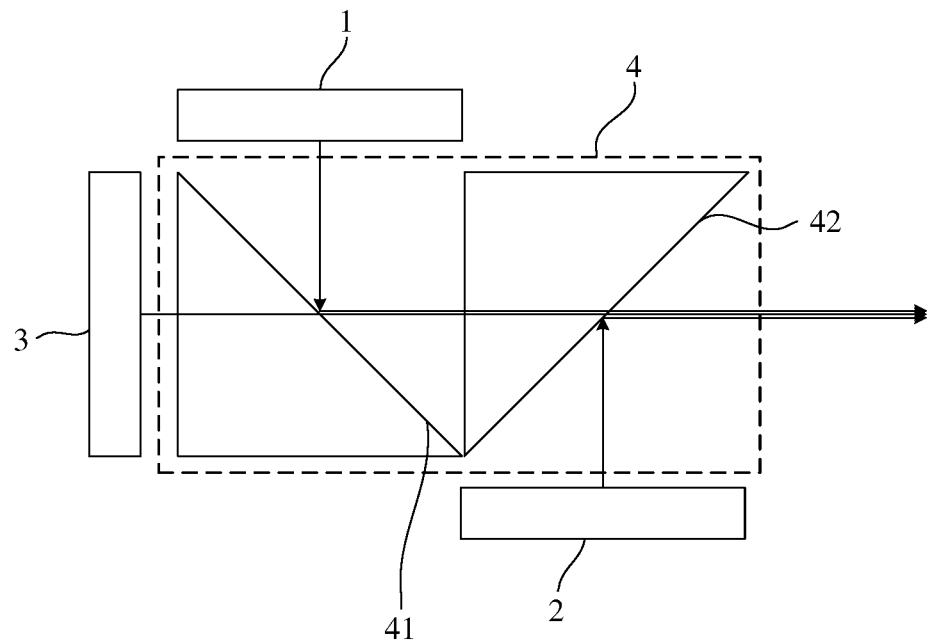
FIG. 15 is a schematic diagram of a state of cooperation between another light combination apparatus and a display panel according to an embodiment of this application.

It should be noted that the foregoing specific structure of the light combination apparatus 4 is only an example. In another possible implementation, a light combination function may be implemented in different prism disposing manners. For example, FIG. 15 is a schematic diagram of a principle of another light combination apparatus. A specific structure of the light combination apparatus 4 is not limited in embodiments of this application, provided that the light combination function can be implemented.

In a possible implementation, as shown in FIG. 6, FIG. 11, FIG. 12, FIG. 13, and FIG. 14, a cross section of the light-combining prism is a square, and four sides of the square respectively correspond to the first incident surface 401, the second incident surface 402, the third incident surface 403, and the emergent surface 40. Two diagonals of the square respectively correspond to the first dichroic reflective surface 41 and the second dichroic reflective surface 42.

In a possible implementation, as shown in FIG. 6 to FIG. 14, the pixel 10 of the first color is a blue pixel, the pixel 20 of the second color is a red pixel, and the pixel 30 of the third color is a green pixel. The first dichroic reflective surface 41 is a blue dichroic reflective surface, and the blue dichroic reflective surface is configured to reflect blue light and enable red light and green light to pass through, that is, light in a large wavelength range is reflected, and light in a small wavelength range passes through. The second dichroic reflective surface 42 is a red dichroic reflective surface, and the red dichroic reflective surface is configured to reflect the red light and enable the green light and the blue light to pass through, that is, the light in the large wavelength range is reflected, and the light in the small wavelength range passes through.

Figure 16:
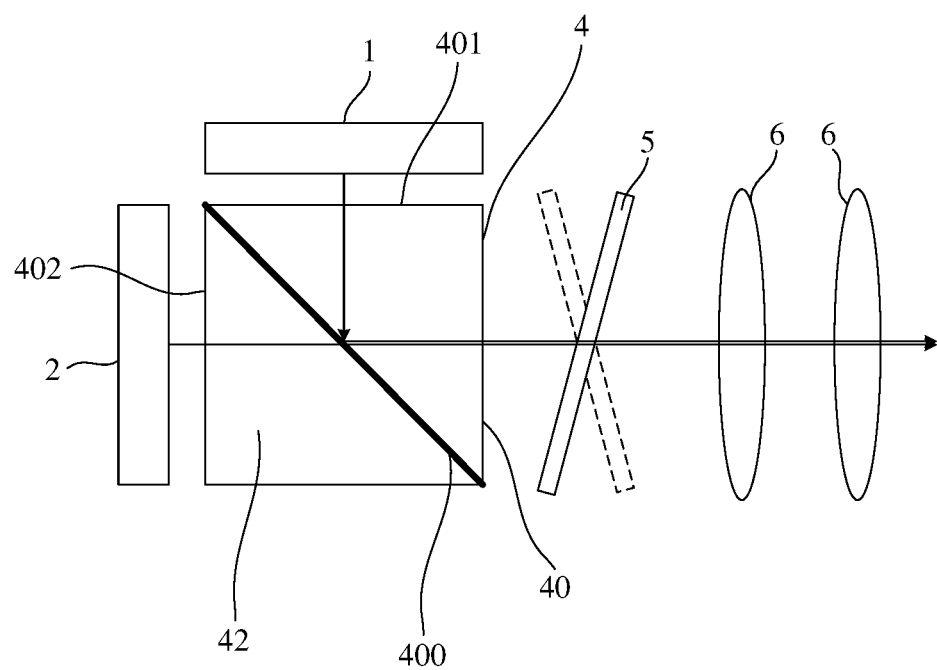
FIG. 16 is a schematic diagram of a structure of another projection optical engine according to an embodiment of this application.
Figure 17:
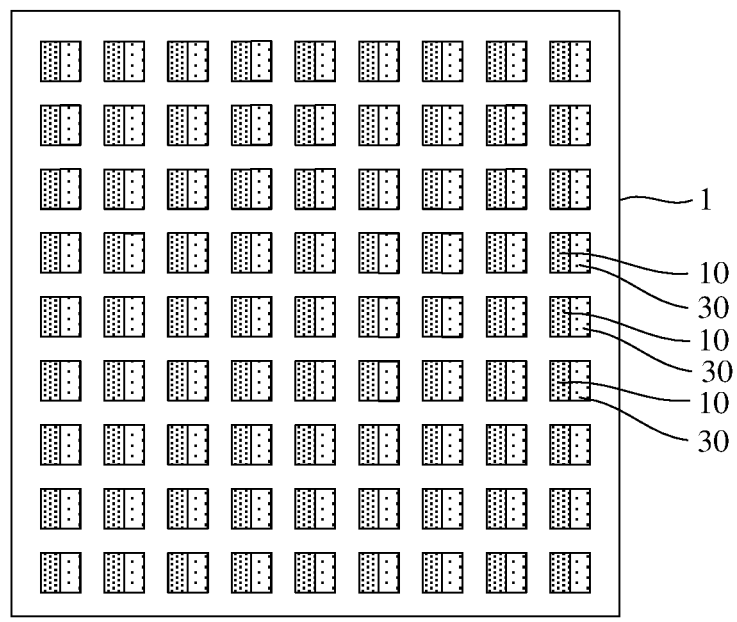
FIG. 17 is a schematic diagram of a structure of a first display panel in FIG. 16.
Figure 18:
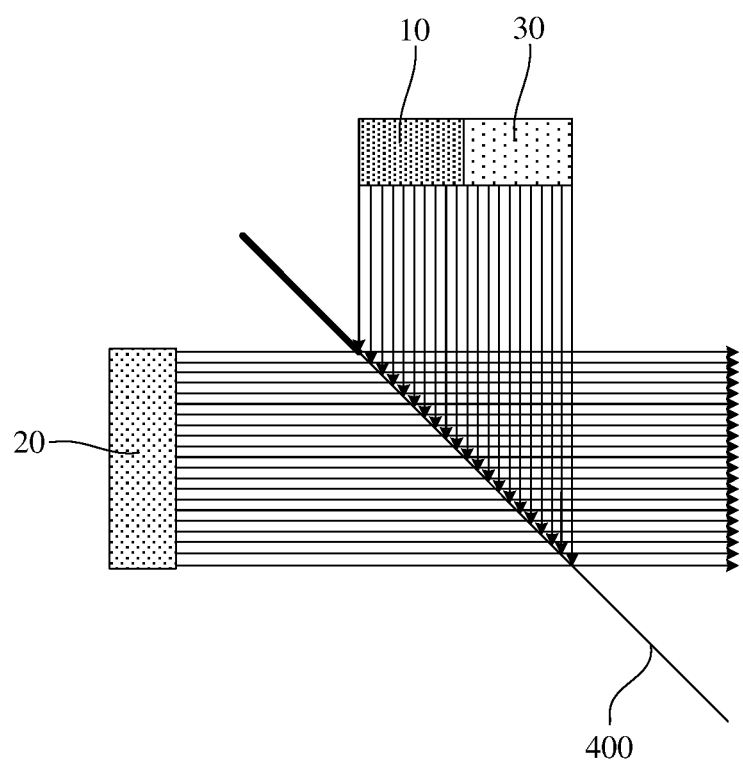
FIG. 18 is a schematic diagram of a state in which light passes through a light combination apparatus in FIG. 16.

In a possible implementation, as shown in FIG. 16, FIG. 17, and FIG. 18, the first display panel 1 further includes a plurality of pixels 30 of a third color, and the pixel 30 of the third color includes an active light-emitting device. Different from the structure in the foregoing embodiment, in this embodiment, the first display panel 1 includes not only pixels of one color, but pixels of two colors: the pixel 10 of the first color and the pixel 30 of the third color. The corresponding pixel 10 of the first color and pixel 30 of the third color are disposed at locations close to each other. In this structure, a color pixel formed by pixels of three colors may be implemented by disposing only two display panels.

In a possible implementation, as shown in FIG. 16, FIG. 17, and FIG. 18, the light combination apparatus 4 is configured to overlap light emitted by a same pixel 20 of the second color with the light emitted by one pixel 10 of the first color and the light emitted by one pixel 30 of the third color, and emit overlapped light. In the projection imaging method, in the light combination apparatus 4, the light emitted by the same pixel 20 of the second color is overlapped with the light emitted by the pixel 10 of the first color and the light emitted by the pixel 30 of the third color, and light is emitted. That is, a part of the light emitted by one pixel 20 of the second color is overlapped with the light emitted by one pixel 10 of the first color, and the other part of the light emitted by the pixel 20 of the second color is overlapped with the light emitted by one pixel 30 of the third color. For the first display panel 1, pixels of two colors are produced. Because the pixels of the two colors are separated in a plane direction, when the light emitted by the first display panel 1 and the light emitted by the second display panel 2 are combined, it is difficult to combine the light emitted by the pixel 10 of the first color and the light emitted by the pixel 30 of the third color into a same ray of light. That is, the pixel 10 of the first color and the pixel 30 of the third color can only be used as sub-pixels of two colors separated in plane space for display, and only the light emitted by the pixel 20 of the second color may be combined with the light emitted by the first display panel 1 to form mixed-color light. If the light emitted by the pixel 20 of the second color is combined with only the light emitted by the pixel 10 of the first color to form mixed-color light, and then the mixed-color light is combined with single-color light emitted by the pixel 30 of the third color that is spatially separated to form a full-color pixel, it is equivalent to that one single-color sub-pixel and one mixed-color sub-pixel are combined to form a full-color pixel. In this embodiment of this application, the light emitted by the pixel 20 of the second color is separately overlapped with the light emitted by the pixel 10 of the first color and the light emitted by the pixel 30 of the third color. That is, a part of the light emitted by the pixel 20 of the second color and the light emitted by the pixel 10 of the first color are combined to form a ray of mixed-color light, the other part of the light emitted by the pixel 20 of the second color and the light emitted by the pixel 30 of the third color are combined to form another ray of mixed-color light, and the two rays of mixed-color light form one full-color pixel. This is equivalent to that two mixed-color sub-pixels form one full-color pixel. Compared with a full-color pixel including a single-color sub-pixel, an actual color of a pixel may be presented more accurately, to improve display effect of a color pixel formed by light of three colors.

In a possible implementation, as shown in FIG. 16, FIG. 17, and FIG. 18, the light combination apparatus 4 includes a dichroic reflective surface 400. The dichroic reflective surface 400 is configured to reflect the light emitted by the first display panel 1, so that the light emitted by the first display panel 1 is reflected and then emitted on the emergent surface 40 of the light combination apparatus 4. On the emergent surface 40 of the light combination apparatus 4, both the light emitted by the first display panel 1 and the light emitted by the second display panel 2 are emitted in a same direction, that is, the dichroic reflective surface 400 is configured to reflect light of a first color and light of a third color, and is configured to enable light of a second color to pass through. On the dichroic reflective surface 400, the light emitted by the pixel 20 of the second color and the light emitted by the pixel 10 of the first color are overlapped and combined, and then light is emitted, and the light emitted by the pixel 20 of the second color and the light emitted by the pixel 30 of the third color are overlapped and combined, and then light is emitted. In the projection imaging method, in the light combination apparatus 4, the light emitted by the pixel 10 of the first color and the light emitted by the pixel 30 of the third color are reflected on the dichroic reflective surface 400, and the light emitted by the pixel 20 of the second color passes through the dichroic reflective surface 400. On the emergent surface 40 of the light combination apparatus 4, a part of the light emitted by the pixel 20 of the second color is combined with the light emitted by the pixel 10 of the first color, and then light is emitted; and the other part of the light emitted by the pixel 20 of the second color is combined with the light emitted by the pixel 30 of the third color, and then light is emitted.

In a possible implementation, as shown in FIG. 16, FIG. 17, and FIG. 18, the pixel 10 of the first color is a green pixel, the pixel 20 of the second color is a red pixel, and the pixel 30 of the third color is a blue pixel. The dichroic reflective surface 400 is configured to enable the red light to pass through, and reflect the blue light and the green light. Based on a dichroic reflection principle, a wavelength of the red light is greater than a wavelength of the blue light and the green light. Therefore, the dichroic reflective surface 400 may be disposed to reflect the blue light and the green light in a smaller wavelength range and enable the red light in a larger wavelength range to pass through. It should be noted that, in another possible implementation, locations of the first display panel 1 and the second display panel 2 may alternatively be interchanged. In this case, the dichroic reflective surface 400 needs to be disposed to reflect the red light and enable the blue light and the green light to pass through.

Figure 19:
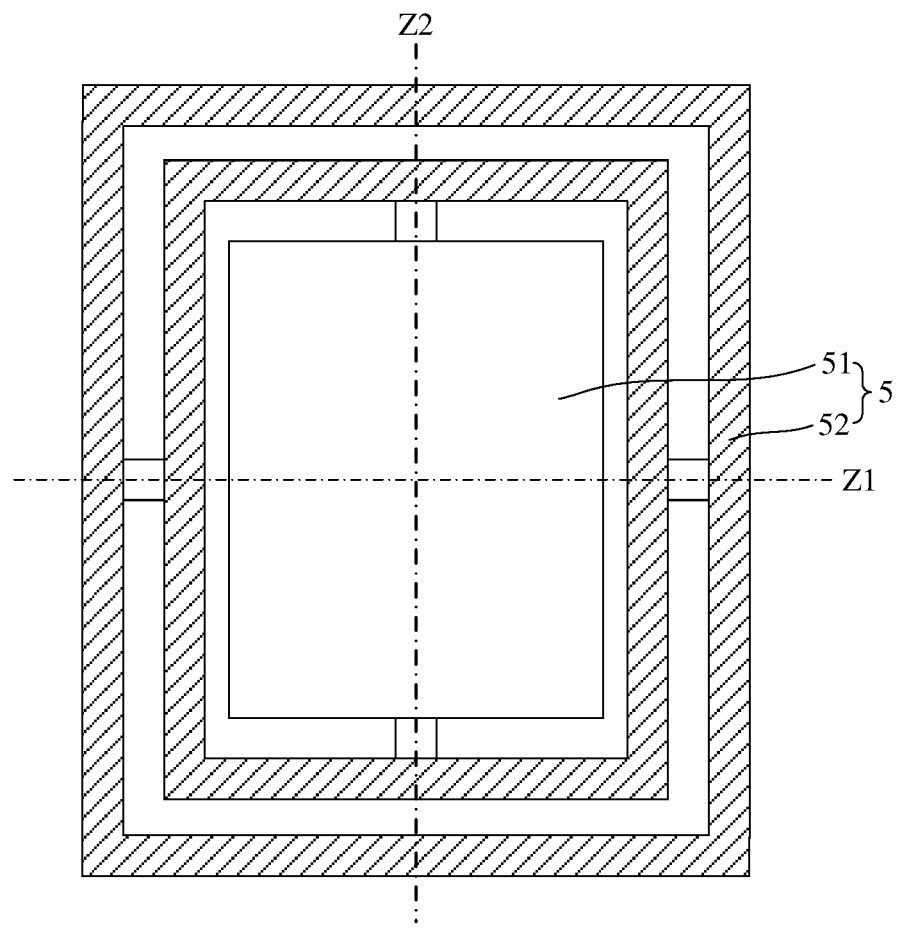
FIG. 19 is a schematic diagram of a structure of a pixel expansion apparatus according to an embodiment of this application.
Figure 20:
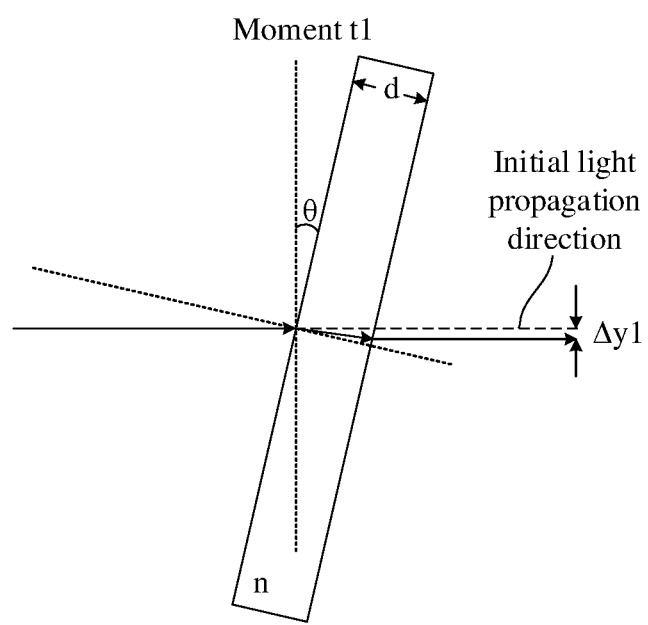
FIG. 20 is a schematic diagram of a light path of a pixel expansion state according to an embodiment of this application.
Figure 21:
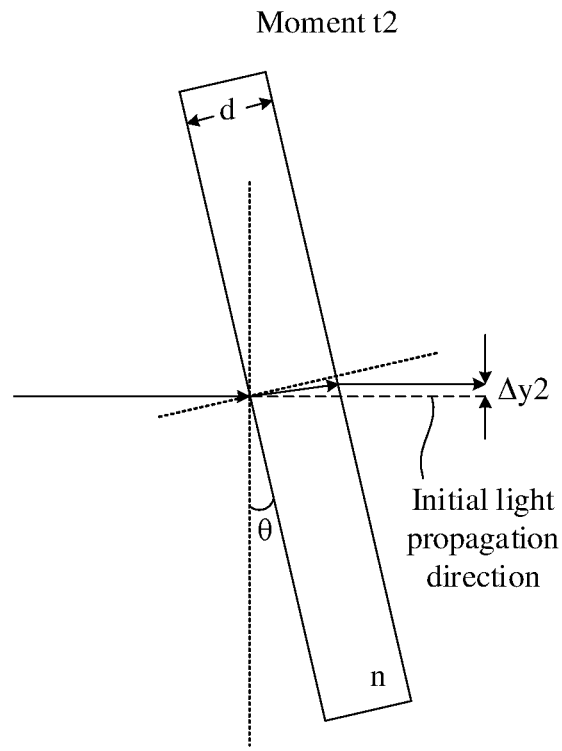
FIG. 21 is a schematic diagram of a light path of another pixel expansion state according to an embodiment of this application.
Figure 22:
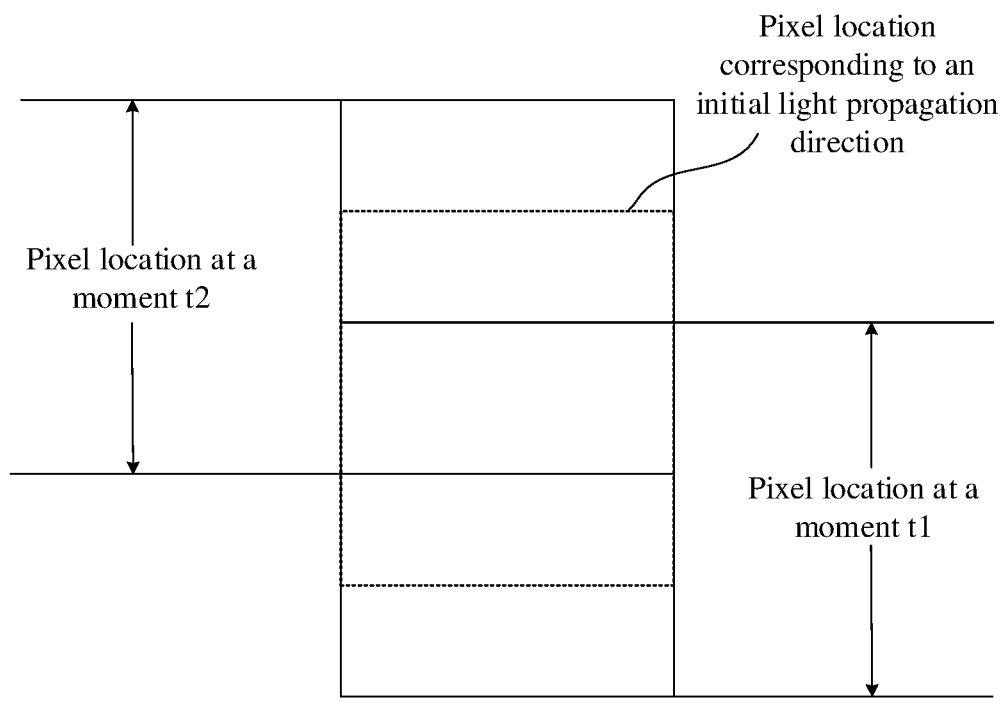
FIG. 22 is a schematic diagram of a state of an imaging plane according to an embodiment of this application.

In a possible implementation, as shown in FIG. 6, FIG. 16, and FIG. 19, the pixel expansion apparatus 5 includes a refraction plate 51 and a control component 52. The control component 52 is configured to enable the refraction plate 51 to rotate to different postures. The refraction plate 51 is located between the light combination apparatus 4 and the optical engine lens 6. When the refraction plate 51 is in different postures, the light emitted by the light combination apparatus 4 is refracted to different locations on the imaging plane for imaging after passing through the refraction plate 51. In the projection imaging method, at the first moment t1, the control component 52 controls the refraction plate 51 to rotate to a first posture, and the light emitted by the light combination apparatus 4 is refracted to the first location region on the imaging plane for imaging after passing through the refraction plate 51 in the first posture. At the second moment t2, the control component 52 controls the refraction plate 51 to rotate to the second posture, and the light emitted by the light combination apparatus 4 is refracted to the second location region on the imaging plane for imaging after passing through the refraction plate 51 in the second posture.

Specifically, as shown in FIG. 6, FIG. 16, FIG. 19, and FIG. 20 to FIG. 22, the refraction plate 51 is, for example, a transparent flat plate with a thickness of d and a refractive index of n, and may be, for example, glass or plastic. The control component 52 may be fastened to an edge of the refraction plate 51 in a manner of clamping or the like, so that the control component 52 can control, in response to driving of an electrical signal, the refraction plate 51 to rotate by different angles. For example, at the moment t1, the refraction plate 51 rotates clockwise by an angle θ under driving of the control component 52, and when light propagating to the right passes through the refraction plate 51, a propagation direction of the light changes according to a refraction law, that is, after the light passes through the refraction plate 51, the propagation direction is parallel to an initial light propagation direction. However, there is specific displacement Δy1, that is, an actual pixel location is Δy1 below a location of the initial light propagation direction. At the moment t2, the refraction plate 51 rotates counterclockwise by an angle θ under the driving of the control component 52, and correspondingly, the propagation direction of the light passing through the refraction plate 51 is parallel to the initial light propagation direction. However, there is specific displacement Δy2, that is, the actual pixel location is Δy2 above the location of the initial light propagation direction. A pixel displacement distance may be calculated according to the refraction law:

$$\Delta y1 = \Delta y2 = d\sin\theta\left(1 - \sqrt{\frac{1-\sin^2\theta}{n^2-\sin^2\theta}}\right).$$

That is, at the moment t1, a pixel location is offset downward by $$d\sin\theta\left(1 - \sqrt{\frac{1-\sin^2\theta}{n^2-\sin^2\theta}}\right)$$

relative to a pixel location corresponding to the initial light propagation direction, and at the moment t2, the pixel location is offset upward by $$d\sin\theta\left(1 - \sqrt{\frac{1-\sin^2\theta}{n^2-\sin^2\theta}}\right)$$

relative to the pixel location corresponding to the initial light propagation direction. In this case, at the two moments, a pixel is offset by $$2d\sin\theta\left(1 - \sqrt{\frac{1-\sin^2\theta}{n^2-\sin^2\theta}}\right).$$

This is equivalent to that a new pixel location is generated by using the pixel expansion apparatus 5 based on an original actual pixel, thereby implementing a resolution expansion function. It should be noted that, at the two moments shown in FIG. 20 to FIG. 22, angles of rotation of the refraction plate 51 have a same magnitude and opposite directions, but actually the refraction plate 51 may be controlled by the control component 52 to have different angles of rotation at different moments, thereby implementing different pixel offset distances.

In a possible implementation, as shown in FIG. 19, the control component 52 is configured to enable the refraction plate 51 to rotate along a first axis Z1 and rotate along a second axis Z2, where the first axis Z1 is perpendicular to the second axis Z2, that is, the refraction plate 51 may rotate in two directions. A combination of different postures to which the refraction plate 51 rotates is controlled, so that pixel expansion at more locations can be implemented.

Figure 23:
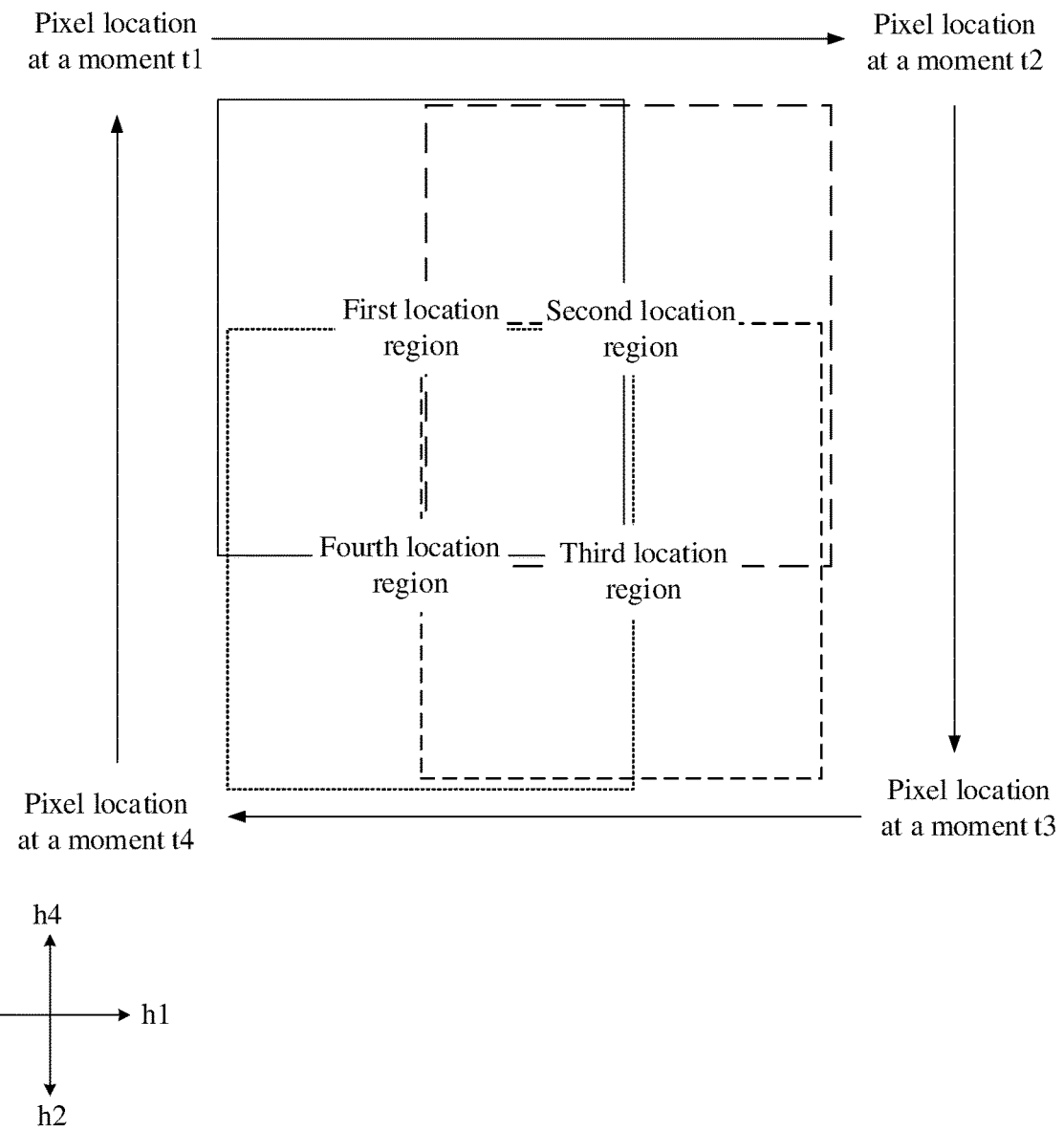
FIG. 23 is a schematic diagram of a state of another imaging plane according to an embodiment of this application.

In a possible implementation, as shown in FIG. 16, FIG. 19, and FIG. 23, the refraction plate 51 is controlled to rotate along two axes, so that resolution can be separately doubled in a horizontal direction and a vertical direction. The control component 52 is configured to enable the refraction plate 51 to cyclically rotate to the first posture, the second posture, a third posture, and a fourth posture. At the first moment t1, the refraction plate 51 is in the first posture. When the refraction plate 51 is in the first posture, the light emitted by the light combination apparatus 4 is imaged in the first location region on the imaging plane. At the second moment t2, the refraction plate 51 is in the second posture. When the refraction plate 51 is in the second posture, the light emitted by the light combination apparatus 4 is imaged in the second location region on the imaging plane, where the second location region is offset relative to the first location region in a first direction h1. For example, a pixel is shifted rightward by half of a pixel size. It is assumed that the pixel size is 8 μm×8 μm, and the pixel is shifted rightward by 4 μm. At a third moment t3, the refraction plate 51 is in the third posture. When the refraction plate 51 is in the third posture, the light emitted by the light combination apparatus 4 is imaged in a third location region on the imaging plane, where the third location region is offset relative to the second location region in a second direction h2, and the second direction h2 is perpendicular to the first direction h1. For example, a pixel is shifted downward by 4 μm. At a fourth moment t4, the refraction plate 51 is in the fourth posture. When the refraction plate 51 is in the fourth posture, the light emitted by the light combination apparatus 4 is imaged in a fourth location region on the imaging plane, where the fourth location region is offset relative to the third location region in a third direction h3, the first location region is offset relative to the fourth location region in a fourth direction h4, the third direction h3 is opposite to the first direction h1, and the fourth direction h4 is opposite to the second direction h2. For example, a pixel is shifted leftward by 4 μm. The control component 52 may control the refraction plate 51 to change from the fourth posture to the first posture after the fourth moment t4, for example, a pixel is shifted upward by 4 μm to return to an initial location and enter a next cycle. That is, a same pixel cyclically switches between four location regions, so that the same pixel is imaged at four locations at different times, to implement pixel expansion. Because a spacing between pixels on a display panel is extremely small, to implement the pixel expansion, adjacent location regions are partially overlapped. In the projection imaging method, each cycle sequentially includes the first moment t1, the second moment t2, the third moment t3, and the fourth moment t4. At the first moment t1, the control component 52 controls the refraction plate 51 to rotate to the first posture, and the light emitted by the light combination apparatus 4 is refracted to the first location region on the imaging plane for imaging after passing through the refraction plate 51 in the first posture. At the second moment t2, the control component 52 controls the refraction plate 51 to rotate to the second posture, and the light emitted by the light combination apparatus 4 is refracted to the second location region on the imaging plane for imaging after passing through the refraction plate 51 in the second posture. At the third moment t3, the control component 52 controls the refraction plate 51 to rotate to the third posture, and the light emitted by the light combination apparatus 4 is refracted to the third location region on the imaging plane for imaging after passing through the refraction plate 51 in the third posture. At the fourth moment t4, the control component 52 controls the refraction plate 51 to rotate to the fourth posture, and the light emitted by the light combination apparatus 4 is refracted to the fourth location region on the imaging plane for imaging after passing through the refraction plate 51 in the fourth posture.

It can be learned that, the refraction plate 51 is controlled to cyclically rotate between the t1 and the t4, so that one physical pixel may have display effect of four pixels on the imaging plane, to obtain resolution expansion. That is, a display panel with resolution of 320×240 may have resolution of 640×480 on the imaging plane. It is assumed that a pixel in a display panel in a conventional technology includes a micro LED, and a total quantity of pixels in the display panel is 640×480. If a pixel size is 4 μm×4 μm, and a corresponding panel size is 0.13", a corresponding light-emitting part of the micro LED is a circle with a diameter of about 1.7 μm, and light-emitting efficiency of micro LEDs of red, green, and blue pixels in this light-emitting area is respectively about 2%, 7%, and 9% (a drive current density 70 A/cm² is used as an example). If the pixel size is changed to 8 μm×8 μm, the corresponding light-emitting part of the micro LED is a circle with a diameter of about 6 μm, and the light-emitting efficiency of the micro LEDs of the red, green, and blue pixels in this light-emitting area is respectively about 8%, 13%, and 18% (the drive current density 70 A/cm² is used as an example). That is, the pixel size is doubled, so that the light-emitting efficiency of the red, green, and blue pixels can be quadrupled, doubled, and doubled, respectively. However, if an overall size of the display panel needs to be ensured to remain unchanged, increasing the pixel size may cause the resolution of the display panel to decrease from 640×480 to 320×240, that is, cause the resolution to decrease to a quarter of the original resolution. However, in this embodiment of this application, pixel expansion may be performed on a display panel by using the pixel expansion apparatus 5, so that a display panel with resolution of 320×240 has resolution of 640×480 on the imaging plane when a size of the display panel is ensured to remain unchanged. In this way, the pixel size can be increased, to improve light-emitting efficiency and reduce power consumption.

Figure 24:
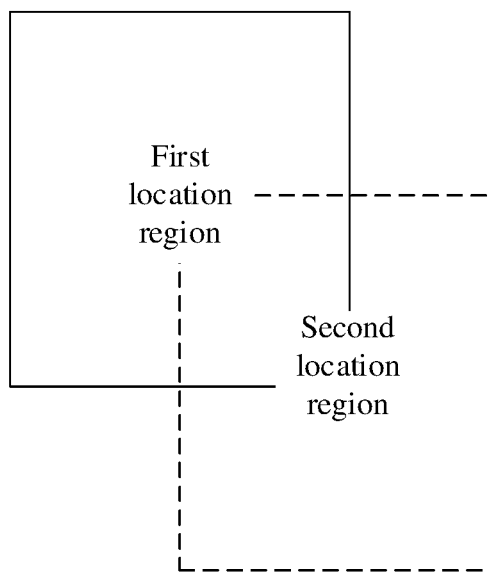
FIG. 24 is a schematic diagram of a state of another imaging plane according to an embodiment of this application.
Figure 24:
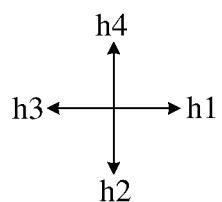

In a possible implementation, as shown in FIG. 24, the control component 52 is configured to enable the refraction plate 51 to cyclically rotate to the first posture and the second posture. At the first moment t1, the refraction plate 51 is in the first posture. When the refraction plate 51 is in the first posture, the light emitted by the light combination apparatus 4 is imaged in the first location region on the imaging plane. At the second moment t2, the refraction plate 51 is in the second posture. When the refraction plate 51 is in the second posture, the light emitted by the light combination apparatus 4 is imaged in the second location region on the imaging plane, where the second location region is offset relative to the first location region in the first direction h1 and the second direction h2. That is, a pixel is shifted once along a diagonal, and then the refraction plate 51 may be controlled to rotate to return to the first posture and enter a next cycle, so that a same pixel is imaged at two locations at different times. In this way, one physical pixel implements display effect of two pixels. That is, the pixel expansion apparatus 5 in this embodiment of this application can double pixel expansion, or may quadruple pixel expansion. In addition, if the refraction plate 51 is driven to rotate to more postures for display, pixel expansion of a higher multiple may be further implemented.

In a possible implementation, a pixel size of the pixel 10 of the first color is less than 10 µm, a pixel size of the pixel 20 of the second color is less than 10 µm, and a pixel size of the pixel 30 of the third color is less than 10 µm. This size is a size of the active light-emitting device.

In a possible implementation, the pixel 10 of the first color includes a micro light-emitting diode micro LED of a first color, the pixel 20 of the second color includes a micro LED of a second color, and the pixel 30 of the third color includes a micro LED of a third color. That is, the display panels in this embodiment of this application may be a micro LED display panel. According to the solution in this embodiment of this application, a pixel size can be increased without changing a volume and imaging resolution, to improve light-emitting efficiency and reduce power consumption.

In a possible implementation, the pixel 10 of the first color includes a micro LED and a first color light conversion layer located on a light-emitting side of the micro LED, the pixel 20 of the second color includes a micro LED and a second color light conversion layer located on a light-emitting side of the micro LED, and the pixel 30 of the third color includes a micro LED and a third color light conversion layer located on a light-emitting side of the micro LED. That is, the display panels in this embodiment of this application may be a display panel of a micro LED+a light conversion layer. According to the solution in this embodiment of this application, a pixel size can be increased without changing a volume and imaging resolution, to improve light-emitting efficiency and reduce power consumption.

In a possible implementation, the pixel 10 of the first color includes a micro organic light-emitting diode micro OLED of a first color, the pixel 20 of the second color includes a micro OLED of a second color, and the pixel 30 of the third color includes a micro OLED of a third color. That is, the display panels in this embodiment of this application may be a micro OLED display panel. For the micro OLED display panel, a decrease in a pixel size greatly increases a process difficulty. Therefore, according to the solution in this embodiment of this application, a pixel size can be increased without changing a volume and imaging resolution, to reduce a production process difficulty of the micro OLED display panel.

In addition, an increase in a pixel size facilitates production of a micro optical element, for example, a micro lens array, on a surface of the display panel, to further improve efficiency of the projection optical engine.

An embodiment of this application further provides an electronic device, including the foregoing projection optical engine. A specific structure and a principle of the projection optical engine are not described herein again. The electronic device may be any product that uses the projection optical engine for display, for example, an AR device or a projection device.

In a possible implementation, the electronic device is augmented reality AR glasses.

In embodiments of this application, "at least one" means one or more, and "a plurality of" means two or more. A term "and/or" describes an association relationship between associated objects and indicates that three relationships may exist. For example, A and/or B may indicate the following three cases: Only A exists, both A and B exist, and only B exists, where A and B may be singular or plural. The character "/" generally indicates an "or" relationship between the associated objects. "At least one of the following items" and a similar expression thereof mean any combination of these items, including a single item or any combination of plural items. For example, "at least one of a, b, or c" may indicate a, b, c, "a and b", "a and c", "b and c", or "a, b, and c", where a, b, and c may be singular or plural.

The foregoing descriptions are only preferred embodiments of this application, and are not intended to limit this application. For a person skilled in the art, this application may have various modifications and variations. Any modification, equivalent replacement, improvement, or the like made without departing from the spirit and principle of this application shall fall within the protection scope of this application.

What is claimed is:

1. A projection optical engine, comprising:
   a first display panel, wherein the first display panel comprises a plurality of pixels of a first color, and each pixel of the plurality of pixels of the first color comprises an active light-emitting device;
   a second display panel, wherein the second display panel comprises a plurality of pixels of a second color, and each pixel of the plurality of pixels of the second color comprises an active light-emitting device;
   a light combination apparatus, wherein the light combination apparatus is configured to:
      combine, as combined light, light emitted by one pixel of the first color and light emitted by one pixel of the second color; and
      emit the combined light;
   a pixel expansion apparatus; and
   an optical engine lens, wherein:
      light emitted by the light combination apparatus is imaged on an imaging plane after passing through the pixel expansion apparatus and the optical engine lens;

the pixel expansion apparatus is configured to enable the light emitted by the light combination apparatus to be imaged at different locations on the imaging plane at different moments; and a total quantity of pixels disposed in the first display panel is less than display resolution of an image formed by the first display panel on the imaging plane, and a total quantity of pixels disposed in the second display panel is less than display resolution of an image formed by the second display panel on the imaging plane.

2. The projection optical engine according to claim 1, further comprising:

a third display panel, wherein the third display panel comprises a plurality of pixels of a third color, and each pixel of the plurality of pixels of the third color comprises an active light-emitting device; and the light combination apparatus is configured to:
combine, as combined light, light emitted by one pixel of the first color, light emitted by one pixel of the second color, and light emitted by one pixel of the third color; and
emit the combined light.

3. The projection optical engine according to claim 2, wherein:

the light combination apparatus comprises a first dichroic reflective surface, wherein the first dichroic reflective surface is configured to reflect light emitted by the first display panel, and wherein the light emitted by the first display panel is reflected and then emitted on an emergent surface of the light combination apparatus;

the light combination apparatus further comprises a second dichroic reflective surface, wherein the second dichroic reflective surface is configured to reflect light emitted by the second display panel, and wherein the light emitted by the second display panel is reflected and then emitted on the emergent surface of the light combination apparatus; and on the emergent surface of the light combination apparatus, the light emitted by the first display panel, the light emitted by the second display panel, and light emitted by the third display panel are all emitted in a same direction.

4. The projection optical engine according to claim 3, wherein:

the light combination apparatus comprises a light-combining prism, wherein the light-combining prism comprises a first incident surface, a second incident surface, a third incident surface, and the emergent surface, and wherein the first incident surface is opposite to the second incident surface, and the third incident surface is opposite to the emergent surface;

a light-emitting surface of the first display panel faces the first incident surface of the light-combining prism, a light-emitting surface of the second display panel faces the second incident surface of the light-combining prism, and a light-emitting surface of the third display panel faces the third incident surface of the light-combining prism; and the first dichroic reflective surface and the second dichroic reflective surface are disposed inside the light-combining prism, and the first dichroic reflective surface and the second dichroic reflective surface are disposed in a cross manner.

5. The projection optical engine according to claim 4, wherein a cross section of the light-combining prism is a square, wherein four sides of the square separately correspond to the first incident surface, the second incident surface, the third incident surface, and the emergent surface; and two diagonals of the square respectively correspond to the first dichroic reflective surface and the second dichroic reflective surface.

6. The projection optical engine according to claim 4, wherein a pixel of the first color is a blue pixel, a pixel of the second color is a red pixel, and a pixel of the third color is a green pixel; and the first dichroic reflective surface is a blue dichroic reflective surface, and the second dichroic reflective surface is a red dichroic reflective surface.

7. The projection optical engine according to claim 1, wherein the first display panel further comprises a plurality of pixels of a third color, and each pixel of the plurality of pixels of the third color comprises an active light-emitting device.

8. The projection optical engine according to claim 7, wherein the light combination apparatus is configured to:

overlap light emitted by a same pixel of the second color with light emitted by one pixel of the first color and light emitted by one pixel of the third color; and emit overlapped light.

9. The projection optical engine according to claim 8, wherein the light combination apparatus comprises a dichroic reflective surface, wherein the dichroic reflective surface is configured to reflect light emitted by the first display panel, and wherein the light emitted by the first display panel is reflected and then emitted on an emergent surface of the light combination apparatus; and on the emergent surface of the light combination apparatus, both the light emitted by the first display panel and light emitted by the second display panel are emitted in a same direction.

10. The projection optical engine according to claim 9, wherein:

a pixel of the first color is a green pixel, a pixel of the second color is a red pixel, and a pixel of the third color is a blue pixel; and the dichroic reflective surface is configured to enable red light to pass through, and reflect blue light and green light.

11. The projection optical engine according to claim 1, wherein the pixel expansion apparatus comprises a refraction plate and a control component, wherein the control component is configured to enable the refraction plate to rotate to different postures, and the refraction plate is located between the light combination apparatus and the optical engine lens; and when the refraction plate is in different postures, light emitted by the light combination apparatus is refracted to different locations on the imaging plane for imaging after passing through the refraction plate.

12. The projection optical engine according to claim 11, wherein the control component is configured to enable the refraction plate to rotate along a first axis and rotate along a second axis, wherein the first axis is perpendicular to the second axis.

13. The projection optical engine according to claim 12, wherein
the control component is configured to enable the refraction plate to cyclically rotate to a first posture, a second posture, a third posture, and a fourth posture;
when the refraction plate is in the first posture, light emitted by the light combination apparatus is imaged in a first location region on the imaging plane;
when the refraction plate is in the second posture, light emitted by the light combination apparatus is imaged in a second location region on the imaging plane, wherein the second location region is offset relative to the first location region in a first direction;
when the refraction plate is in the third posture, light emitted by the light combination apparatus is imaged in a third location region on the imaging plane, wherein the third location region is offset relative to the second location region in a second direction, and the second direction is perpendicular to the first direction; and
when the refraction plate is in the fourth posture, light emitted by the light combination apparatus is imaged in a fourth location region on the imaging plane, wherein the fourth location region is offset relative to the third location region in a third direction, the first location region is offset relative to the fourth location region in a fourth direction, the third direction is opposite to the first direction, and the fourth direction is opposite to the second direction.

14. The projection optical engine according to claim 13, wherein
a pixel size of a pixel of the first color is less than 10 μm; and
a pixel size of a pixel of the second color is less than 10 μm.

15. The projection optical engine according to claim 14, wherein:
a pixel of the first color comprises a micro light-emitting diode (micro LED) of a first color, and the pixel of the second color comprises a micro LED of a second color; or
a pixel of the first color comprises a micro LED and a first color light conversion layer located on a light-emitting side of the micro LED, and the pixel of the second color comprises a micro LED and a second color light conversion layer located on a light-emitting side of the micro LED; or
a pixel of the first color comprises a micro organic light-emitting diode (micro OLED) of a first color, and the pixel of the second color comprises a micro OLED of a second color.

16. An electronic device, comprising a projection optical engine, wherein the projection optical engine comprises:
a first display panel, wherein the first display panel comprises a plurality of pixels of a first color, and each pixel of the plurality of pixels of the first color comprises an active light-emitting device;
a second display panel, wherein the second display panel comprises a plurality of pixels of a second color, and each pixel of the plurality of pixels of the second color comprises an active light-emitting device;
a light combination apparatus, wherein the light combination apparatus is configured to:
combine, as combined light, light emitted by one pixel of the first color and light emitted by one pixel of the second color; and
emit the combined light;
a pixel expansion apparatus; and
an optical engine lens, wherein:
light emitted by the light combination apparatus is imaged on an imaging plane after passing through the pixel expansion apparatus and the optical engine lens;
the pixel expansion apparatus is configured to enable the light emitted by the light combination apparatus to be imaged at different locations on the imaging plane at different moments; and
a total quantity of pixels disposed in the first display panel is less than display resolution of an image formed by the first display panel on the imaging plane, and a total quantity of pixels disposed in the second display panel is less than display resolution of an image formed by the second display panel on the imaging plane.

17. The electronic device according to claim 16, wherein the electronic device is augmented reality (AR) glasses.

18. The electronic device according to claim 16, wherein:
the projection optical engine further comprises:
a third display panel, wherein the third display panel comprises a plurality of pixels of a third color, and each pixel of the plurality of pixels of the third color comprises an active light-emitting device; and
the light combination apparatus is configured to:
combine, as combined light, light emitted by one pixel of the first color, light emitted by one pixel of the second color, and light emitted by one pixel of the third color; and
emit the combined light.

19. The electronic device according to claim 18, wherein:
the light combination apparatus comprises a first dichroic reflective surface, wherein the first dichroic reflective surface is configured to reflect light emitted by the first display panel, and wherein the light emitted by the first display panel is reflected and then emitted on an emergent surface of the light combination apparatus;
the light combination apparatus further comprises a second dichroic reflective surface, wherein the second dichroic reflective surface is configured to reflect light emitted by the second display panel, and wherein the light emitted by the second display panel is reflected and then emitted on the emergent surface of the light combination apparatus; and
on the emergent surface of the light combination apparatus, the light emitted by the first display panel, the light emitted by the second display panel, and light emitted by the third display panel are all emitted in a same direction.

20. A projection imaging method, wherein the projection imaging method is applied to a projection optical engine, and
the projection optical engine comprises:
a first display panel, wherein the first display panel comprises a plurality of pixels of a first color, and each pixel of the plurality of pixels of the first color comprises an active light-emitting device;
a second display panel, wherein the second display panel comprises a plurality of pixels of a second color, and each pixel of the plurality of pixels of the second color comprises an active light-emitting device;
a light combination apparatus;
a pixel expansion apparatus; and
an optical engine lens;

the projection imaging method comprises:
- combining, as combined light, by using the light combination apparatus, light emitted by the pixel of the first color and light emitted by the pixel of the second color; and
- emitting the combined light; wherein:
  - the projection optical engine works in a plurality of cycles, and each cycle comprises a first moment and a second moment;
  - at the first moment, light emitted by the light combination apparatus is imaged in a first location region on an imaging plane after passing through the pixel expansion apparatus and the optical engine lens; and
  - at the second moment, light emitted by the light combination apparatus is imaged in a second location region on the imaging plane after passing through the pixel expansion apparatus and the optical engine lens, wherein the second location region is offset relative to the first location region.

* * * * *